(12) United States Patent
Takahashi et al.

(10) Patent No.: US 6,215,917 B1
(45) Date of Patent: Apr. 10, 2001

(54) OPTICAL SIGNAL TRANSMITTER-RECEIVER MODULE

(75) Inventors: Atsushi Takahashi; Sigeru Takasaki; Yoshihiko Kobayashi, all of Tokyo (JP)

(73) Assignee: Oki Electric Industry Co., Inc., Tokyo (JP)

(*) Notice: Subject to any disclaimer, the term of this patent is extended or adjusted under 35 U.S.C. 154(b) by 0 days.

(21) Appl. No.: 09/299,007

(22) Filed: Apr. 26, 1999

(30) Foreign Application Priority Data

Apr. 27, 1998 (JP) ................................................. 10-116347

(51) Int. Cl.[7] ...................................................... H04B 11/00
(52) U.S. Cl. .................................. 385/14; 385/8; 359/173
(58) Field of Search ........................ 385/14, 1–8; 359/173

(56) References Cited

FOREIGN PATENT DOCUMENTS 09191125    7/1997 (JP).

OTHER PUBLICATIONS

Yamada et al., Recent Progress in Optical Hybrid Integration Using PLC Platform, Technical Report of IEICE, 1996, pp. 1–6.

*Primary Examiner*—Robert Kim
*Assistant Examiner*—Michael P. Stafira
(74) *Attorney, Agent, or Firm*—Venable; Robert J. Frank; Norman N. Kunitz

(57) ABSTRACT

An object is to realize optical signal transmitter-receiver module with high transmitting power and high receiving sensitivity at a low cost. The optical signal transmitter-receiver module 60 includes a planar lightwave circuit (PLC) 61 and a transmitter-receiver circuit. The PLC 61 is made up with a Si substrate 62, a laser diode (LD) 6 generating the optical signal Pt, and a photodiode (PD)7 receiving the optical signal Pr. Both LD 6 and PD 7 are arranged on the Si substrate 62. The LD6 is arranged such that its front face is located in the vicinity of an optical fiber 64. The LD 6 has an optical waveguide layer that is composed of an active layer generating the optical signal Pt and a clad layer functioning as a transparent layer to the optical signal Pr. The PD 7 is arranged such that its front face is located in the vicinity of the backside face of the LD 6 and receives the optical signal Pr having passed through the optical waveguide layer of the LD 6.

21 Claims, 27 Drawing Sheets

F I G. 2 0
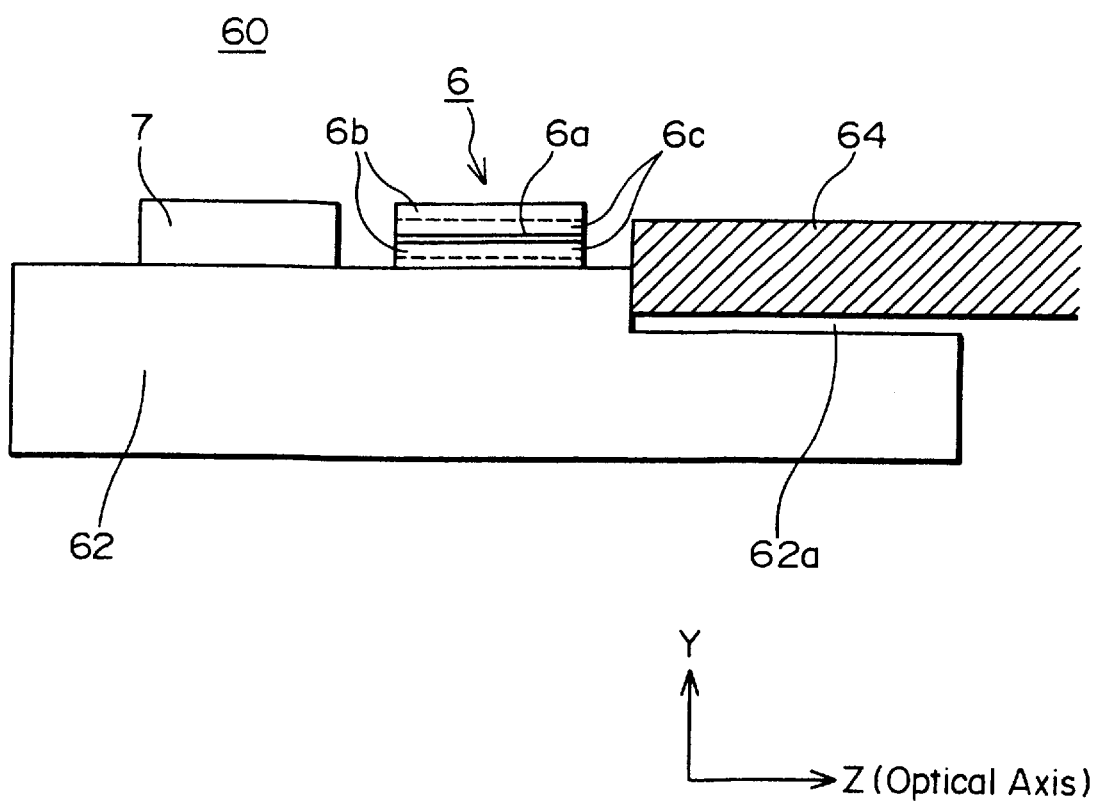

OPTICAL SIGNAL TRANSMITTER-RECEIVER MODULE

BACKGROUND OF THE INVENTION

The present invention relates to an optical signal transmitter-receiver module of the class wherein there are arranged on an identical substrate, a light emitting element and a light receiving element.

Regarding the optical signal transmitter-receiver system, especially for connecting its central office with subscribers, it has been pointed out that to more popularize the system, the optical signal transmitter-receiver module to be installed on the subscriber side should be preferably more compact and be available at a lower cost. A technical report entitled "Present State and Future of Hybrid Optical Integration Technology Using PLC Platform," published by the Institute of Electronics, Information and Communication Engineers of Japan, EMD96-24, discusses an optical signal transmitter-receiver module that could respond to such pointing out. This optical signal transmitter-receiver module includes at least one light emitting element, at least one light receiving element, and an optical waveguide, all of which are mounted on an identical substrate.

At present, such optical signal transmitter-receiver module is still discussed as to whether it is applicable or not, to the synchronous transfer mode passive double star (STM-PDS) system and to the asynchronous transfer mode passive double star (ATM-PDS) system. The STM-PDS system is such a system that operates the optical signal transmitter-receiver module such that it transmits and receives the optical signal in the time sharing mode. On one hand, the ATM-PDS system is such a system that operates the optical signal transmitter-receiver module such that it transmits and receives the optical signal asynchronously.

A prior art optical signal transmitter-receiver module 200 will now be explained in the following with reference to FIGS. 37 through 39 of the accompanying drawings. In these figures, FIG. 37 is a perspective view of the prior art optical signal transmitter-receiver module 200. FIG. 38 is a plan view of the optical signal transmitter-receiver module 200. FIG. 39 is a circuit diagram of an optical signal transmission-reception circuit 205 of the optical signal transmitter-receiver module 200.

As shown in FIG. 37, the optical signal transmitter-receiver module 200 transmits and receives the optical signal having a wavelength of lambda 1 in the time sharing mode. However, it makes the optical signal having a wavelength of lambda 2 transfer to the outside, this optical signal being inputted asynchronously with the transmission-reception of the optical signal having a wavelength of lambda 1.

In the following description and the accompanying drawings, the transmitting optical signal having a wavelength of lambda 1 will be referred to and indicated as "optical signal Pt" while the receiving optical signal with the wavelength of lambda 1 will be referred to and indicated as "optical signal Pr." Furthermore, in this specification and the accompanying drawing, the optical signal having a wavelength of lambda 2 that is indifferent to transmission-reception will be referred to and indicated as "optical signal Pu."

As shown in FIG. 38, the optical signal transmitter-receiver module 200 includes a planar lightwave circuit (PLC) 201, and a signal transmission-reception circuit 205. PLC 201 is composed of a Si substrate 2, a quartz layer 3 formed on the Si substrate 2, an optical waveguide passage 204 formed on the quartz layer 3, a branch passage 204d that is formed in the optical waveguide passage 204 for use in separating the wavelength, a dielectric interference filter 5 arranged on the branch passage 204d, a laser diode (referred to as LD hereinafter) 206 mounted on the surface of the Si substrate 2 and for transmitting the optical signal, a photodiode for monitoring the transmitting optical signal (referred to as m-PD hereinafter) 202 that is mounted on the surface of the Si substrate 2, and a photodiode for receiving the optical signal (referred to as r-PD hereinafter) 203 that is mounted on the surface of the Si substrate 2.

The optical waveguide passage 204 includes an input/output port 204a, an output port 204b, a Y-shaped branch passage 204c, a branch passage 204d, a signal transmitting port 204e, and a signal receiving port 204f. An optical fiber (not shown) for transmitting the optical signal is arranged in the vicinity of the input/output port 204a. Optical signals Pr and Pu transmitted through the above-mentioned optical fiber are inputted to the input/output port 204a. The optical signal Pt generated from the LD 206 is emitted from the input/output port 204 directing to the above-mentioned optical fiber. An optical module (not shown) is arranged in the vicinity of the output port 204b in order to receive the optical signal Pu.

The dielectric interference filter 5 is provided at the branch passage 204d of the optical waveguide passage 204 such that it is buried in a slot formed in the quartz layer 3. This dielectric interference filter 5 allows the optical signal having a wavelength of lambda 1 to pass therethrough, but it reflects the optical signal having a wavelength of lambda 2 inputted through the input/output port 204a, directing to the output port 204b.

The LD 206 is arranged such that its front face is located in the vicinity of the signal transmitting port 204e and emits the optical signal Pt. This optical signal Pt emitted from the LD 206 is inputted to the signal transmitting port 204e. The m-PD 202 is arranged such that its front face is located in the vicinity of the backside face of the LD 206 and receives the optical signal Pm emitted therefrom. The r-PD 203 is arranged such that its front face is located in the vicinity of the signal receiving port 204f and receives the optical signal Pr outputted therefrom.

The signal transmission-reception circuit 205 is composed of a signal transmitting circuit 11 and a signal receiving circuit 12. The signal transmitting circuit 11 drives the LD 206 responding to the transmitting electric signal, keeping the light emission power of the LD 206 constant. As shown in FIG. 39, this signal transmission-reception circuit 205 includes a flip-flop (referred to as F/F hereinafter) circuit 13, an LD driving circuit 14, and an automatic power control (referred to as APC hereinafter) circuit 15. The F/F circuit 13 latches the transmitting electric signal directed to the LD driving circuit 14. The LD driving circuit 14 supplies the LD 206 with a driving current corresponding to the transmitting electric signal given by the F/F 13, and drives the LD 206. The APC circuit 15 controls the driving current supplied from the LD driving circuit 14 to the LD 206 depending on the quantity of the optical signal Pt (emitted from the backside of LD 206) received by the m-PD 202, thereby keeping the light emission power of the LD 206 constant.

The m-PD 202 and the APC circuit 15 are provided just for the purpose of keeping the light emission power of the LD 206 constant. Therefore, should it be enough to consider only the function of transmitting and receiving the optical signal having a wavelength of lambda 1, there might be no need for the m-PD and the APC circuit to be prepared. However, the light emission power of the LD 206 is considerably varied by the ambient temperature even though the driving current is kept constant, so that in order to keep the light emission power of the LD 206, it is needed to adjust the driving current in response to variation of the ambient temperature. For this, it is required that the signal transmission-reception circuit 205 monitors the light emission power of the LD 206 by means of the m-PD 202 and controls the driving current by means of the APC circuit 15 such that difference between the monitored current coming from the m-PD 202 and a reference current value becomes as small as possible, thereby keeping the light emission power of the LD 206 constant.

The signal receiving circuit 12 generates the receiving electric signal depending on the quantity of the optical signal Pr received by the r-PD 203. This signal receiving circuit 12 is composed of a preamplifier 16, an automatic threshold value control (referred to as ATC hereinafter) circuit 17, and a limiting amplifier (referred to as LIM hereinafter) circuit 18. The preamplifier 16 converts the receiving current inputted by the r-PD 203 into a receiving voltage, which is then outputted to the ATC circuit 17. This ATC circuit 17 automatically sets a threshold voltage against the receiving voltage as inputted thereto, adjusts (clips) this receiving voltage referring to the threshold value, and then outputs it to the LIM circuit 18. The LIM circuit 18 converts the receiving voltage given by the ATC circuit 17 into the receiving electric signal in terms of the logic level.

In the next, there will be explained the operation of the above prior art optical signal transmitter-receiver module 200. The optical signal having a wavelength of lambda 1 is transmitted and received in the time sharing mode by the optical signal transmitter-receiver module 200. The optical signal having a wavelength of lambda 2 is always inputted to the input/output port 204a and guided to the output port 204b. FIG. 40 is a timing chart for explaining the transmission-reception operation of the optical signal having a wavelength of lambda 1 by means of the prior art optical signal transmitter-receiver module 200. In FIG. 40, the optical signal PI/0 having a wavelength of lambda 1 that comes in and out from the input/output port 204a, is the optical signal Pt during the period of signal transmission mode while being the optical signal Pr during the period of signal reception mode.

During the period of signal transmission mode for transmitting the optical signal having a wavelength of lambda 1, the transmitting electric signal is latched by the F/F circuit 13 of the signal transmitting circuit 11 on the bit by bit basis and is then inputted to the LD driving circuit 14. The LD driving circuit 14 supplies the LD 206 with the driving current ILD corresponding to the transmitting electric signal that is inputted from the F/F circuit 13, thereby driving the LD 206 to turn it on and off. In this way, the LD 206 generates the optical signal Pt corresponding to the transmitting electric signal. The optical signal Pt emitted from the front face of the LD 206 is inputted to the signal transmitting port 204e.

About 3[dB] (50%) of the optical signal Pt incident on the signal transmitting port 204e leaks outward at the Y-shaped branch passage 204c, and only the remaining 3[dB] thereof is guided up to the dielectric interference filter 5. This optical signal Pt receives the optical loss of about 2[dB] when it passes through the dielectric interference filter 5 and is then emitted from the input/output port 204a. Thus, the optical signal Pt has to be subject to the optical loss of about 5[dB] eventually until it is guided up to the input/output port 204a after incidence on the signal transmitting port 204e.

During the period of signal transmission mode, the optical signal Pt emitted from the backside face of the LD 206 is inputted to the m-PD 202 and converted into the electric current (i.e. a monitoring current ImPD) thereby. This monitoring current ImPD is such a current that has a magnitude corresponding to the light emission power of the LD 206 and is inputted to the APC circuit 15 of the transmitting circuit 11. The APC circuit 15 controls the driving current ILD supplied from the LD driving circuit 14 to the LD 206 such that the monitoring current ImPD is kept constant, thereby keeping the light emission power of the LD 206 constant.

In the next, during the period of signal reception mode for receiving the optical signal having a wavelength of lambda 1, optical signals Pr and Pu are inputted to the input/output port 204a through the optical fiber. The optical signal Pu incident on the input/output port 204a is reflected by the dielectric interference filter 5 and is emitted from the output port 204b.

On one hand, the optical signal Pr incident on the input/output port 204a is allowed to pass through the dielectric interference filter 5. At this time, however, the optical signal Pr receives the optical loss of about 2[dB]. The optical signal Pr having passed through the dielectric interference filter 5 is divided into two parts of about 3[dB] each at the Y-shaped branch passage 204c of the optical waveguide passage 204. One of the divided optical signals Pr is guided to the signal receiving port 204f, then inputted to the r-PD 203, and finally converted into a current (receiving current IrPD) thereby. The other of the divided optical signals Pr is guided to the signal receiving port 204e and is treated there as a redundant current doing nothing to signal receiving operation. Consequently, the optical signal Pr receives the optical loss of about 5[dB] until it propagates to the r-PD 203 through the input/output port 204a and the optical waveguide 204.

The above-mentioned receiving current ImPD is inputted to the preamplifier 16 of the signal receiving circuit, and converted into a corresponding voltage thereby, and further converted into the receiving electric signal in terms of logic level by means of the ATC circuit 17 and the LIM circuit 18.

SUMMARY OF THE INVENTION

In the prior art optical signal transmitter-receiver module 200 as described in the above, formation of the Y-shaped branch passage 204c requires the quartz layer to have a long length. This is because the optical loss due to radiation is increased if the waveguide passage is bent so as to have a small radius of the curvature. Consequently, the PLC substrate requires a larger area capable of accepting the longer and wider quartz layer 3. In general, the larger the PLC substrate area is, the more expensive it is. Furthermore, the process for forming the waveguide passage 204 is a very special one that requires a high precision technology.

As a result, the manufacturing cost of the optical signal transmitter-receiver module 200 can not help being raised due to the complex formation process of the waveguide passage 204 and existence of the Y-shaped branch passage 204c that is against realization of the PLC substrate having a smaller area.

Furthermore, as far as the optical signal transmitter-receiver module 200 includes the Y-shaped branch passage 204c and the dielectric interference filter 5, it can not help permitting the large optical loss to be caused thereby, thus its signal transmitting power and receiving sensitivity being lowered.

Still furthermore, the optical signal transmitter-receiver module 200 is provided with the m-PD 202 for monitoring the transmitting optical signal and the r-PD 203 for receiving the optical signal. Therefore, if the transmitter-receiver module 200 operates in the time sharing mode, the operation of the m-PD 202 and r-PD 203 is carried out also in the time sharing mode. This means that the optical signal transmitter-receiver module 200 spends the unnecessary time for its operation.

Accordingly, the invention has been made in order to obviate the above-mentioned problems existing in the prior art optical signal transmitter-receiver module, and its object is to realize a novel and improved optical signal transmitter-receiver module with the high transmitting power and the high receiving sensitivity at a low cost.

In order to achieve the above object, according to the invention, there is provide an optical signal transmitter-receiver module including a light emitting element that generates a first optical signal to be transmitted to an optical transmission means, a light receiving element that receives a second optical signal transmitted through the optical transmission means, and an identical substrate on which the light emitting element and a light receiving element are arranged, characterized in that the light emitting element has a front face emitting the first optical signal to be transmitted to the optical transmission means and an optical waveguide layer including a clad layer that functions as a transparent layer to the second optical signal, permits the second optical signal incident on the front face of the optical waveguide layer to pass therethrough, and emits it from the backside face of the same, and the light receiving element that is arranged behind the light emitting element and receives the second optical signal having passed through the light emitting element.

BRIEF DESCRIPTION OF THE DRAWINGS

The above and other features of the invention and the concomitant advantages will be better understood and appreciated by person skilled in the field to which the invention pertains in view of the following description given in conjunction with the accompanying drawings which illustrate preferred embodiments.

FIG. 20 is a cross sectional view taken on line A–A' in FIG. 19;

DETAILED DESCRIPTION OF THE PREFERRED EMBODIMENTS

First Embodiment

Figure 1:
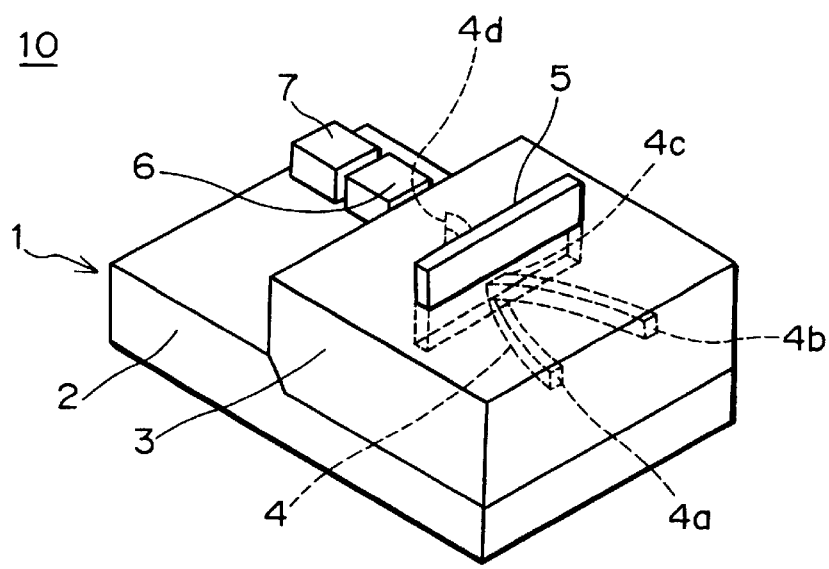
FIG. 1 is a perspective view of an optical transmitter-receiver module according to the first embodiment of the invention.
Figure 2:
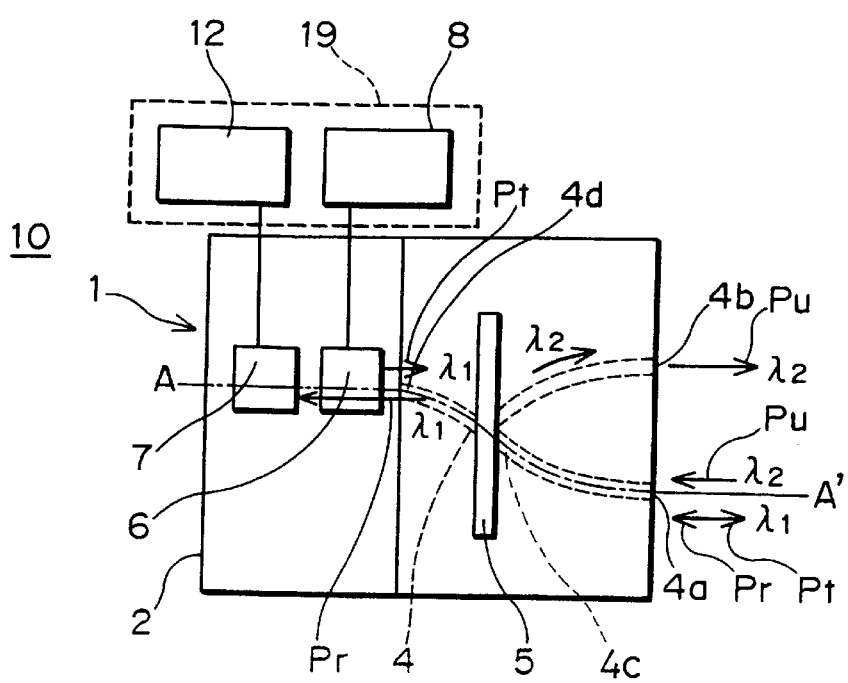
FIG. 2 is a plan view of the optical transmitter-receiver module according to the first embodiment of the invention.
Figure 3:
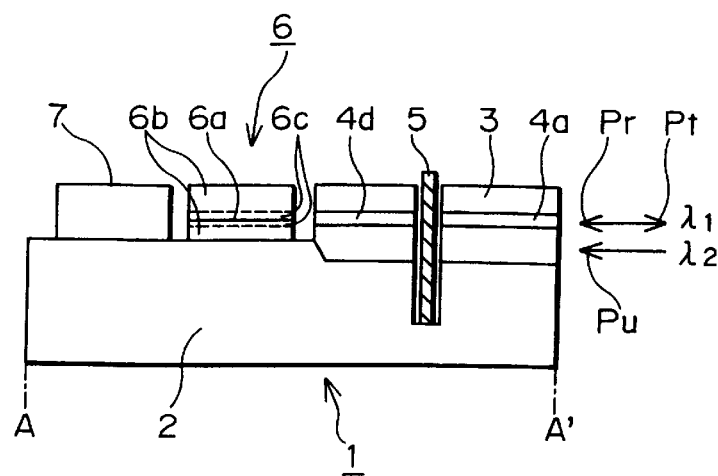
FIG. 3 is a cross sectional view taken on line A–A' in FIG. 2.
Figure 4:
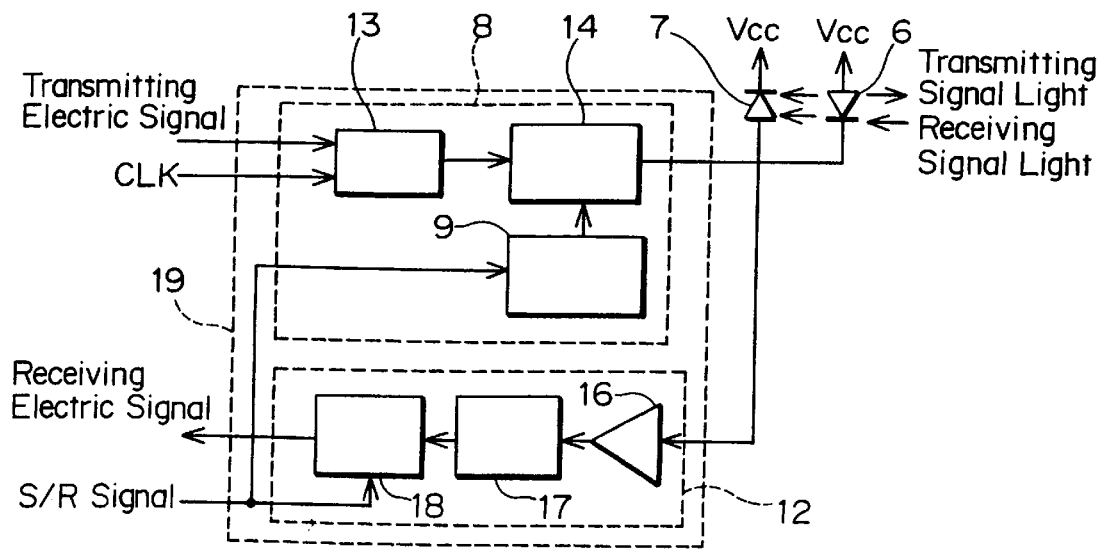
FIG. 4 is a structural illustration indicating the function of a signal transmission-reception circuit of the optical signal transmitter-receiver module according to the first embodiment of the invention.

FIG. 1 is a perspective view of an optical transmitter-receiver module according to the first embodiment of the invention. FIG. 2 is a plan view of the optical transmitter-receiver module according to the first embodiment of the invention. FIG. 3 is a cross sectional view taken on line A–A' in FIG. 2. FIG. 4 is a structural illustration indicating the function of a signal transmission-reception circuit of the optical signal transmitter-receiver module according to the first embodiment of the invention.

As described in the above, in this specification and the accompanying drawings, the transmitting optical signal having a wavelength of lambda 1 will be referred to and indicated as "optical signal Pt" while the receiving optical signal with the wave length lambda 1 will be referred to and indicated as "optical signal Pr." Furthermore, in this specification and the accompanying drawings, the optical signal that has a wavelength lambda 2 that is indifferent to signal transmission and reception will be referred to and indicated as "optical signal Pu."

An optical transmitter-receiver module 10 according to the first embodiment of the invention transmits and receives the optical signal having a wavelength of lambda 1 in the time sharing mode. However, it transfers the optical signal having a wavelength of lambda 2 to the outside, this optical signal being inputted asynchronously with the transmission and reception of the optical signal having a wavelength of lambda 1. In this case, values of lambda 1 and lambda 2 are 1.3 micrometers and 1.5 micrometers, respectively, for instance.

The optical transmitter-receiver module 10 according to the first embodiment includes a planar lightwave circuit (PLC) 1 and a signal transmission-reception circuit 19. PLC 1 is composed of a Si substrate 2, a quartz layer (quartz glass layer) 3, an optical waveguide passage 4, a dielectric interference filter 5 provided on the way of the optical waveguide passage 4, a laser diode (referred to as LD hereinafter) 6 for generating the optical signal Pt (first optical signal), and a photodiode (referred to as PD hereinafter) 7 for receiving the optical signal Pr (second optical signal).

The Si substrate 2 includes two portions, one being recessed to the other and the other being raised to the one. The quartz layer 3 is formed on the surface of the recessed portion of the Si substrate while the LD 6 and PD 7 are located on the surface of the raised portion of the same. The quartz layer 3 has a thickness of 40 micrometers, for instance.

The optical waveguide passage 4 is formed in the quartz layer 3 such that its refractivity becomes higher by 0.4% than that of its surroundings. This optical waveguide passage 4 has an input/output port 4a, an output port 4b, a branch passage 4c, and a signal transmitting-receiving port 4d. An optical fiber (not shown) for transmitting the optical signal is arranged in the vicinity of the input/output port 4a. Optical signals Pr and Pu transmitted through the optical fiber (not shown) are inputted to the input/output port 4a. This input/output port 4a emits the optical signal Pt given by the LD6, directing to the above-mentioned optical fiber. In the vicinity of the output port 4b is arranged a module (not shown) for receiving the optical signal Pu.

The dielectric interference filter 5 is buried in an insertion slot formed in the quartz layer 3 such that it goes across the branch passage 4c of the optical waveguide passage 4. This dielectric interference filler 5 allows the optical signal having a wavelength of lambda 1 to pass therethrough while reflecting the optical signal having a wavelength of lambda 2 coming from the input/output port 4a, directing to the output port 4b.

As shown in FIG. 3, the LD 6 is arranged on the raised portion of the Si substrate 2 such that its front side is located in the vicinity of the signal transmitting-receiving port 4d. This LD 6 includes a waveguide layer 6c consisting of an active layer 6a that generates the optical signal Pt and a clad layer 6b that is formed of upper and lower layers sandwiching the active layer 6a therebetween. The optical signal Pt emitted from the front face of the LD 6 is inputted to the signal transmitting-receiving port 4d. This port 4d is formed such that the optical signal Pr transmitted is inputted to the waveguide layer 6c (not only to the active layer 6a but also to clad layer 6b). The active layer 6a absorbs the optical signal Pr (as an absorption layer for the incident light having a wavelength of lambda 1) while the clad layer 6b allows the optical signal Pr to pass therethrough (as transparent layer for the incident light having a wavelength of lambda 1). The active layer 6a is made of InGaAsP while clad layer 6b is InP, for instance.

The PD 7 is arranged on the raised portion of the Si substrate 2 such that its front face is located in the vicinity of the backside face of the LD 6. The PD 7 receives the optical signal that passes through the waveguide layer 6c and is then emitted from the backside face of the LD 6.

As indicated in FIG. 4, the signal transmission-reception circuit 19 is composed of a signal transmitting circuit 8 and a signal receiving circuit 12. The signal transmitting circuit 8 is a circuit for driving the LD 6 corresponding to the transmitting electric signal and is made up with a flip-flop circuit (referred to as F/F hereinafter) 13, a mode control circuit 9, and an LD driving circuit 14. The LD 6 is connected with a power source Vcc and the LD driving circuit 14 through its anode and cathode, respectively.

The F/F 13 is provided with an input terminal for receiving a clock signal CLK as inputted thereto, another input terminal for receiving the transmitting electric signal as inputted thereto, and an output terminal for outputting the latched transmitting electric signal. This F/F 13 latches the transmitting electric signal upon every rising and falling of the clock signal CLK.

The mode control circuit 9 is provided with an input terminal for receiving a transmission-reception mode signal S/R and an output terminal for outputting a driving control signal. This mode control circuit 9 generates a driving control signal for controlling the LD driving circuit 14 in response to the transmission-reception mode signal S/R. This transmission-reception mode signal S/R is a signal that defines a time for transmitting the optical signal having a wavelength of lambda 1 (i.e. period of signal transmission mode) as well as a time for receiving the optical signal having a wavelength of lambda 1 (i.e. period of sinal reception mode). In this description, a period during which the transmission-reception signal S/R takes a high level (indicated as "H" hereinafter), is referred to as the period of signal transmission mode, and a period during which the transmission-reception mode signal S/R takes a low level (indicated as "L" hereinafter), is referred to as the period of signal reception mode.

The LD driving circuit 14 is provided with an input terminal for receiving the transmitting electric signal given by the F/F 13, an input terminal receiving a driving control signal given by the mode control circuit 9, and a driving current output terminal connected with the cathode of the LD 6, and supplies the driving current to the LD 6 in response to the transmitting electric signal inputted from the F/F 13 during the period of signal transmission mode.

The signal receiving circuit 12 generates the receiving electric signal based on the quantity of the optical signal having a wavelength of lambda 1 that is received by the PD 7. This signal receiving circuit 12 is made up with a preamplifier 16, an automatic threshold value (referred to as ATC hereinafter) circuit 17, and a limiting amplifier (referred to as LIM hereinafter) circuit 18. The PD 7 is connected with the power source Vcc through its cathode and also connected with the preamplifier 16 through its anode.

The preamplifier 16 converts the current inputted from the anode of the PD 7 into a receiving voltage and outputs it to the ATC circuit 17. This ATC circuit 17 automatically sets a threshold voltage against the receiving voltage as inputted thereto, adjusts (clips) the above receiving voltage referring to the threshold value, and then outputs it to the LIM circuit 18. The LIM circuit 18 is provided with an input terminal for receiving the transmission-reception mode signal S/R, another input terminal for receiving the receiving voltage from the ATC circuit 17, and an output terminal for outputting the receiving electric signal, and converts the receiving voltage inputted from the ATC circuit 17 into the receiving electric signal in terms of the logic level when it is during the period of signal reception mode.

Figure 5:
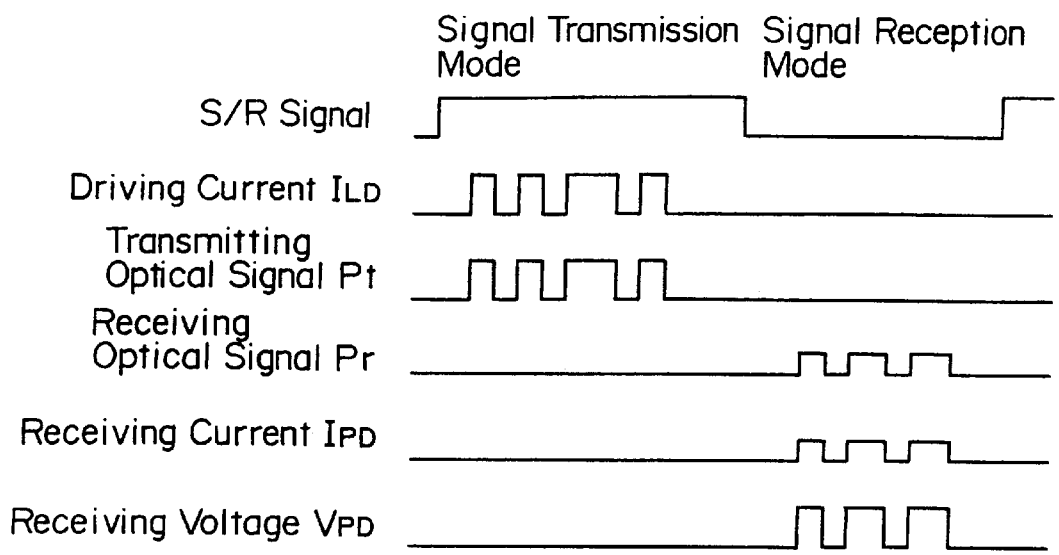
FIG. 5 is a timing chart for explaining the operation for transmitting and receiving the optical signal having a wavelength of lambda 1 in the optical signal transmitter-receiver module according to the first embodiment of the invention.

In the next, there will be described the operation of the optical signal transmitter-receiver module 10 according to the first embodiment. In the optical signal transmitter-receiver module 10, optical signals (Pt, Pr) having a wavelength of lambda 1 are transmitted and received in the time sharing mode. The optical signal (Pu) having a wavelength of lambda 2 is always inputted to the transmitting-receiving port 4a and is guided to the output port 4b. FIG. 5 is a timing chart for explaining the operation for transmitting and receiving the optical signal having a wavelength of lambda 1 in the optical signal transmitter-receiver module according to the first embodiment. The transmitting-receiving optical signal having a wavelength of lambda 1 is a bidirectional signal such as that which is used in a telephone and communication system. On one hand, the optical signal having a wavelength of lambda 2 is an image signal, for instance.

First of all, during the period of signal transmission mode (i.e. transmission-reception mode signal S/R is at "H" level), the optical signal Pu is inputted to the input/output port 4a through the optical fiber. This optical signal Pu incident on the input/output port 4a is reflected by the dielectric interference filter 5 and then emitted from the output port 4b.

The transmitting electric signal is latched on the bit by bit basis by the F/F 13 of the signal transmitting circuit 8 and is inputted to the LD driving circuit 14, which in turn supplies the driving current ILD corresponding to the transmitting electric signal inputted from the F/F 13 to the LD 6, thereby turning on and off the LD 6. With this, the LD 6 comes to generate the optical signal Pt corresponding to the transmitting electric signal. The optical signal Pt emitted from the front face of the LD6 is inputted to the transmitting-receiving port 4d.

The optical signal Pt incident on the transmission-reception port 4d is guided through the optical waveguide passage 4, allowed to passes through the dielectric interference filter 5, emitted from the input/output port 4a, and then directed to an object receiving end through the optical fiber. When the above optical signal Pt passes through the dielectric interference filter 5, it receives a optical loss of about 2[dB]. During this period of signal transmission mode (transmission-reception mode signal S/R is at "H" level), the LIM circuit 18 of the signal receiving circuit 12 is made not to emit any receiving electric signal (by forcibly making the receiving electric signal at "L" level). Therefore, any erroneous signal can not be involved in the receiving electric signal.

Next, during the period of signal reception mode for receiving the optical signal having a wavelength of lambda 1 (transmission-reception mode signal S/R is at "L" level), a multiple optical signal consisting of optical signals Pr and Pu are inputted to the input/output port 4a through the optical fiber. The optical signal Pu incident on the input/output port 4a is reflected by the dielectric interference filter 5 and then emitted from the output port 4b.

The optical signal Pr incident on the input/output port 4a is allowed to pass through the dielectric interference filter 5. At this time, the optical signal Pr receives an optical loss of about 2[dB]. The optical signal Pr having passed through the dielectric interference filter 5 is guided to the transmitting-receiving port 4d and inputted to the waveguide layer 6c of the LD 6. As the wavelength of the optical signal Pr is identical to the oscillation wavelength of the LD 6 and no current is supplied to the LD 6 (LD 6 makes no oscillation), the active layer 6a of the LD 6 absorbs the optical signal Pr. However, the optical signal Pr incident on the clad layer 6d is allowed to pass therethrough. The optical signal Pr having passed through the waveguide layer 6c (mainly clad layer 6b) is inputted to the PD 7 and converted into a current (receiving current IPD) thereby. Thus, according to the optical signal transmitter-receiver module 10, as the optical signal Pr passes through the clad layer 6b, the loss of the optical signal Pr at the LD 6 is suppressed, thus enabling the PD 7 to receive the optical signal Pt of a sufficient quantity.

The above receiving current IPD is inputted to the preamplifier 16 of the signal receiving circuit 12 and converted into a voltage (receiving voltage VPD) thereby. This voltage is subsequently inputted to the ATC circuit 17. This ATC circuit 17 optimizes a threshold voltage in correspondence with the amplitude of the receiving voltage as inputted thereto, adjusts (clips) the receiving voltage VPD according to this threshold voltage, and outputs it to the LIM circuit 18, which in turn converts the inputted receiving voltage VPD into the receiving electric signal in terms of logic level. During the period of signal reception mode (transmission-reception mode signal S/R is at "L" level), the mode control circuit 9 of the signal transmitting circuit 8 forcibly stops the operation of the LD driving circuit 14 so that the LD 6 emits no light.

As described in the above, according to the first embodiment, there is provided the optical signal transmitter-receiver module wherein the PD 7 is arranged behind the LD 6, the optical signal Pr as transmitted comes in the waveguide layer 6c of the LD 6, and is received by the PD 7 after passing through the waveguide layer 6c (especially clad layer 6b). Accordingly, there is no need for any Y-shaped branch passage dividing the optical signal Pr to be prepared. This enables the area of the expensive optical circuit substrate to be reduced, thus lowering the manufacturing cost. Furthermore, the optical loss of about 3[dB] caused by the Y-shaped branch passage can be eliminated, so that the invention makes it possible to realize an optical signal transmitter-receiver module with high transmission power and high receiving sensitivity.

Second Embodiment

Figure 6:
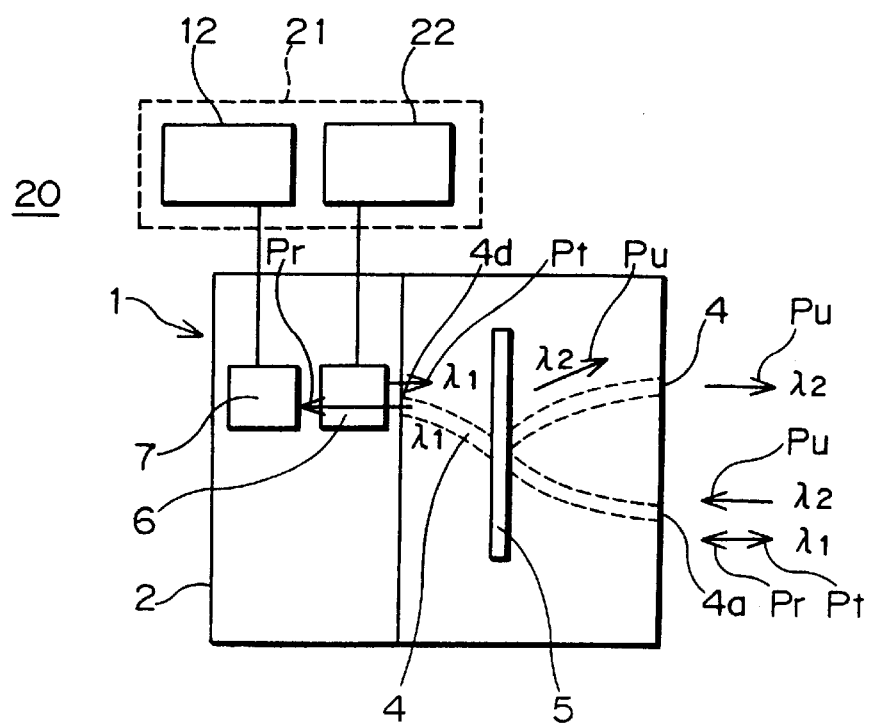
FIG. 6 is a plan view of an optical signal transmitter-receiver module according to the second embodiment of the invention.
Figure 7:
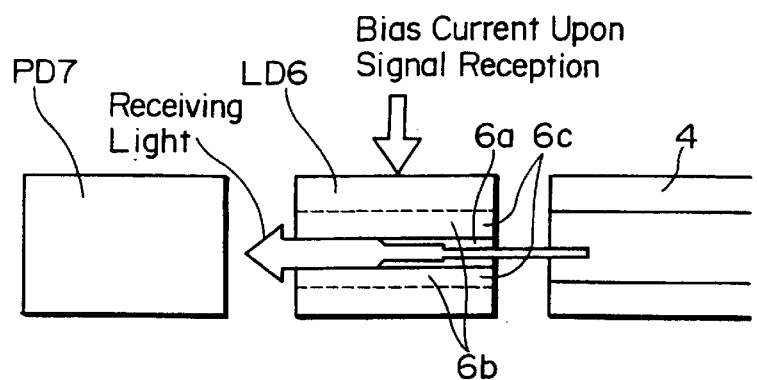
FIG. 7 is a cross sectional view for explaining the light propagation in the optical signal transmitter-receiver module according to the second embodiment of the invention.
Figure 8:
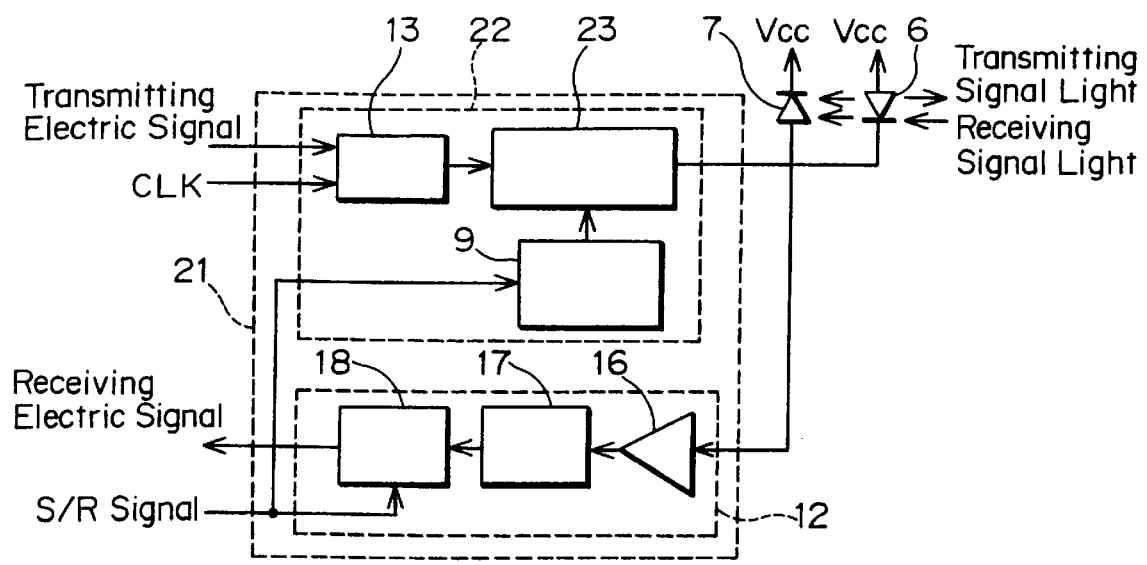
FIG. 8 is a structural illustration indicating the function of a signal transmission-reception circuit of the optical signal transmitter-receiver module according to the second embodiment of the invention.

FIG. 6 is a plan view of an optical signal transmitter-receiver module according to the second embodiment of the invention. FIG. 7 is a cross sectional view for explaining the light propagation in the optical signal transmitter-receiver module according to the second embodiment of the invention. FIG. 8 is a structural illustration indicating the function of a signal transmission-reception circuit of the optical signal transmitter-receiver module according to the second embodiment of the invention. In these figures, the parts essentially identical to those as shown in FIGS. 1 through 4 are denoted with the same reference numerals. Similar to the first embodiment, an optical signal transmitter-receiver module 20 according to the second embodiment transmits and receives the optical signal having a wavelength of lambda 1 in the time sharing mode. However, it transfers the optical signal having a wavelength of lambda 2 to the outside, this optical signal being inputted asynchronously with the transmission-reception of the optical signal having a wavelength of lambda 1.

As shown in FIG. 8, the optical signal transmitter-receiver module 20 according to the second embodiment is provided with a PLC 1 and a signal transmission-reception circuit 21. This signal transmission-reception circuit 21 is provided with a signal transmitting circuit 22 and a signal receiving circuit 12. In short, the optical signal transmitter-receiver module 20 according to the second embodiment is made up by substituting the signal transmitting circuit 22 for the signal transmitting circuit 8 for driving the LD 6 of the transmitter-receiver module 10 according to the first embodiment.

The signal transmitting circuit 22 includes a F/F 13, a mode control circuit 9, and an LD driving/biasing circuit 23. In short, the signal transmitting circuit 22 is made up by substituting the LD driving/biasing circuit 23 for the LD driving circuit 14 in the signal transmitting circuit 8 (FIG. 4) of the first embodiment.

Figure 9:
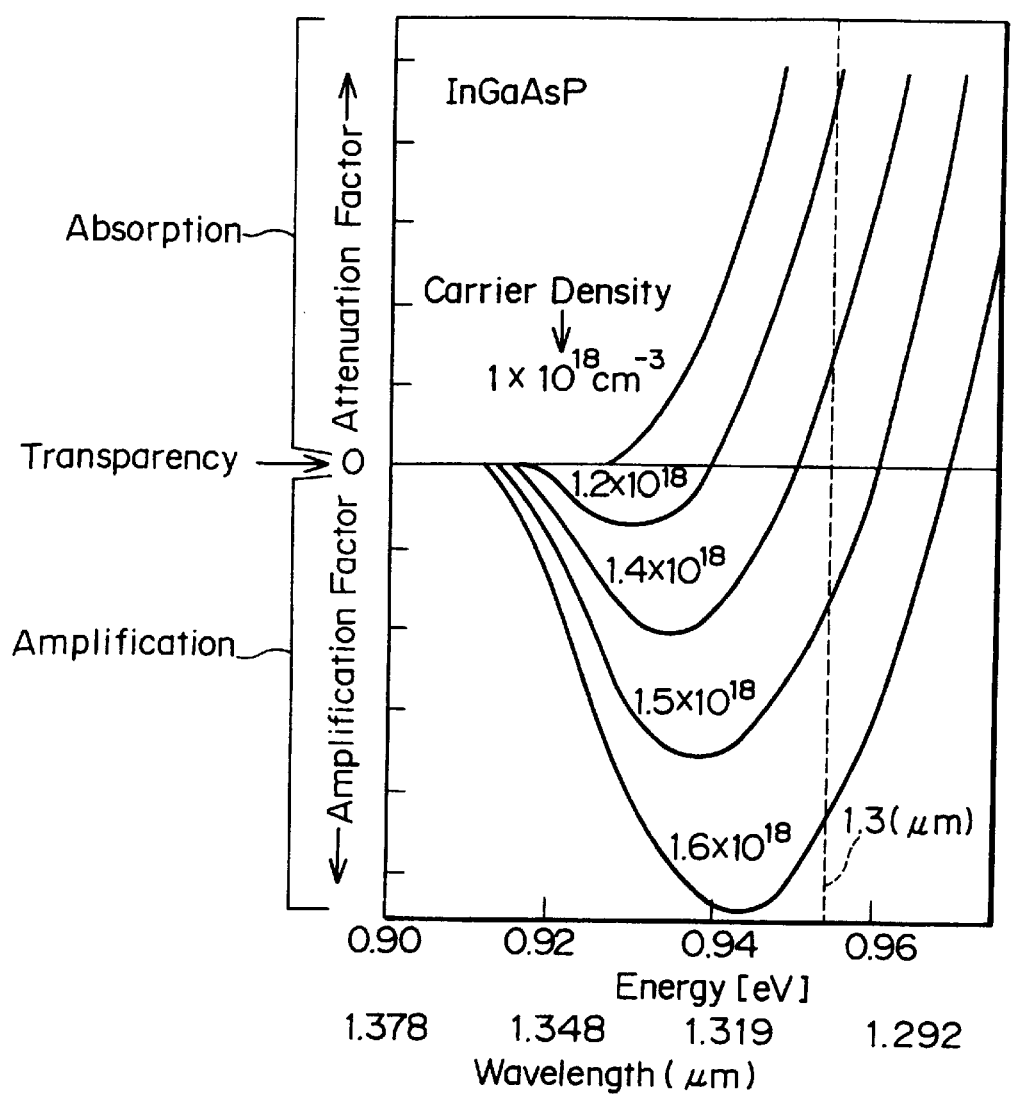
FIG. 9 is a graphical illustration showing Absorption/Transparency/Amplification vs Wavelength (Energy) on an LD having an active layer made of InGaAsP at the time when it is exposed to the light coming from the outside, wherein the parameter is the density of carriers in an active layer.
Figure 10:
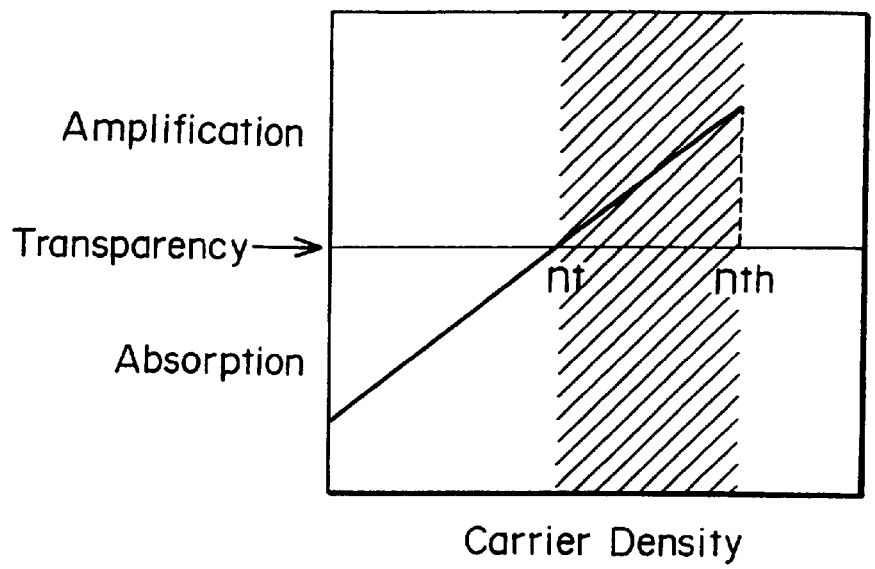
FIG. 10 is a graphical illustration showing Absorption/Transparency/Amplification vs Carrier Density on an LD having the active layer made of InGaAsP at the time when it is exposed to the light having a wavelength of 1.3 micrometers.
Figure 11:
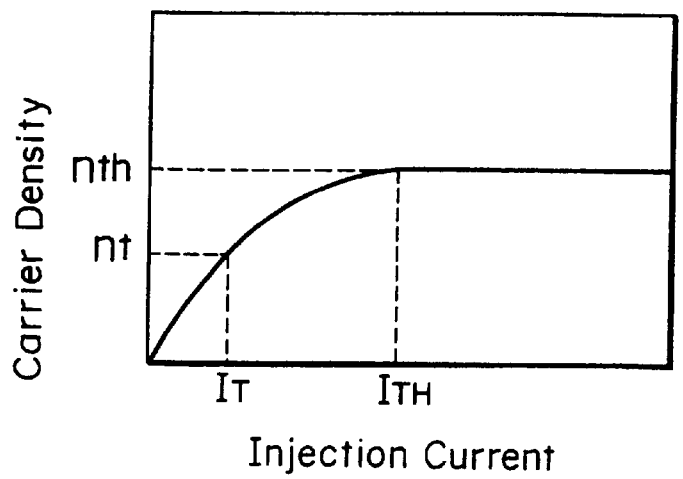
FIG. 11 is a graphical illustration showing Carrier Density vs Injection Current on an LD having the active layer made of InGaAsP.
Figure 12:
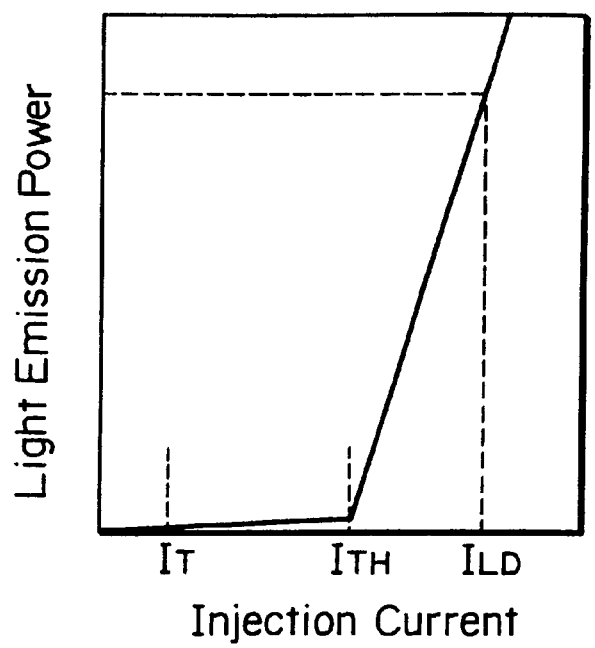
FIG. 12 is a graphical illustration showing Light Emission Power vs Injection Current on an LD having the active layer made of InGaAsP.

FIG. 9 is a graphical illustration showing Absorption/Transparency/Amplification vs Wavelength (Energy) with respect to an LD having an active layer made of InGaAsP at the time when it is exposed to the light coming from the outside, wherein the parameter is the density of carriers in an active layer. In this FIG. 9, an arbitrary scale is given to its ordinate. FIG. 10 is a graphical illustration showing Absorption/Transparency/Amplification vs Carrier Density with respect to an LD having the active layer made of InGaAsP at the time when it is exposed to light rays having a wavelength of 1.3 micrometers. FIG. 11 is a graphical illustration showing Carrier Density vs Injection Current with respect to an LD having the active layer made of InGaAsP. FIG. 12 is a graphical illustration showing Light Emission Power vs Injection Current with respect to an LD having the active layer made of InGaAsP.

As shown in FIGS. 9 and 10, the active layer of the LD functions as the absorption layer to light rays having a wavelength of 1.3 micrometers while the carrier density is small. With increase in carrier density, however, it varies its function from the function as the absorption layer to the function as the transparent layer, further to the function as the amplification layer. On one hand, to light rays having a wavelength of 1.3 micrometers or longer, for instance light rays having a wavelength of 1.5 micrometers, the active layer of the LD always functions as the transparent layer regardless of the carrier density. In this context, "absorption layer" means that it causes an absorption loss against light rays incident thereon. "Amplification layer" means that it provides a gain for light rays incident thereon. "Transparent layer" means that it allows light rays incident thereon to pass therethrough substantially as it is.

Furthermore, as shown in FIG. 12, as the injection current increases and reaches its threshold value ITH, the LD starts oscillating. A current ILD in FIG. 12 represents a driving current necessary for the LD to start its oscillation (during the period of signal transmission mode). Also, as shown in FIGS. 11 and 12, the carrier density is increased with increase in injection current before reaching the threshold current ITH that causes the laser oscillation to start. However, after the injection current has once exceeded the threshold current ITH, the carrier density is kept constant.

Accordingly, if there is injected to the LD a current (bias current) that makes a carrier density to come between the carrier density nt having the active layer acted as the transparent layer and the carrier density nth having the LD begun to oscillate, in other words a bias current between the current IT corresponding to the carrier density nt and the current ITH corresponding to the carrier density nth, the active layer of the LD comes to amplify the incident light rays coming from the outside without causing any oscillation. Therefore, during the period of signal reception mode, if such a bias current is applied to the LD 6 by making use of the above phenomena, it becomes possible to amplify the optical signal Pr incident on the active layer 6c of the LD 6. It is also possible, even though the carrier density is less than nt, to reduce the light absorption by the active layer of the LD by injecting the bias current to the LD, and increasing the carrier density.

Figure 13:
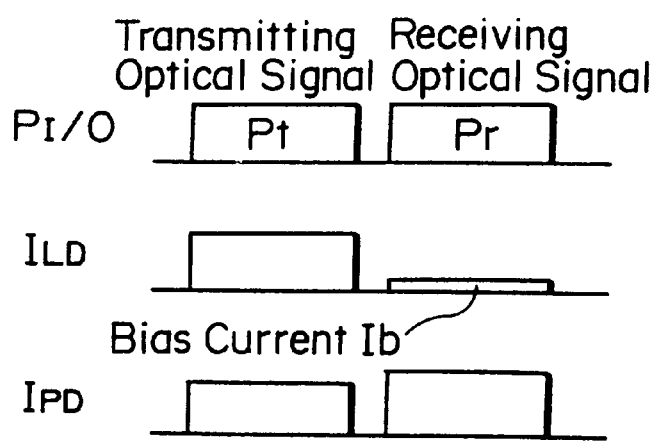
FIG. 13 is a timing chart for explaining the operation for transmitting and receiving the optical signal having a wavelength of lambda 1 in the optical signal transmitter-receiver module according to the second embodiment of the invention.

In the next, there will be explained the operation of the optical signal transmitter-receiver module 20 according to the second embodiment. Similar to the first embodiment, the optical signal transmitter-receiver module 20 transmits and receives the optical signal having a wavelength of lambda 1 in the time sharing mode. Also, the optical signal having a wavelength of lambda 2 always comes in the input/output port 4a. The transfer operation of the optical signal Pu in the signal transmission-reception mode is identical to the operation in the first embodiment, thus the explanation thereof being omitted. FIG. 13 is a timing chart for explaining the operation for transmitting and receiving the optical signal having a wavelength of lambda 1 in the optical signal transmitter-receiver module 20 according to the second embodiment of the invention. The optical signal PI/O at the signal transmitting-receiving port 4d is the optical signal Pt during the period of signal transmission mode while being the optical signal Pr during the period of signal reception mode.

During the period of signal reception mode for receiving the optical signal having a wavelength of lambda 1, the optical signal Pr incident on the input/output port 4a passes through the dielectric interference filter 5 and receives the optical loss of about 2[dB]. The optical signal Pr having passed through the dielectric interference filter 5 propagates to the signal transmitting-receiving port 4d and comes in the waveguide 6c of the LD 6. At this time, the bias current larger than the current IT but smaller than the threshold current ITH is supplied to the LD 6 from the LD driving/biasing circuit 23, thereby making the carrier density of the LD 6 have a value between nt and nth. With this, the active layer 6a of the LD 6 does not oscillate but amplifies the incident optical signal Pr (the active layer 6a functions as the amplification layer). The clad layer 6b of the LD 6 allows the optical signal Pr incident thereon to pass therethrough (the clad layer 6b functions as the transparent layer). Thus, the optical signal Pr having a wavelength of lambda 1 incident on the active layer 6a of the LD 6 passes therethrough receiving amplification thereby while the optical signal Pr having a wavelength of lambda 1 incident on the clad layer 6b passes therethrough. The optical signal Pr having a wavelength of lambda 1 having passed through the LD 6 in such a way, comes in the PD 7 and is converted into the current (receiving current IPD) thereby.

As described in the above, similar to the first embodiment, the optical signal transmitter-receiver module according to the second embodiment is constructed such that the PD 7 is arranged behind the LD6, the optical signal Pr as transmitted comes in the waveguide layer 6c of the LD 6, and the optical signal Pr having passed through the waveguide layer 6c is received by the PD 7. In addition, according to the second embodiment, the bias current lower than the oscillation threshold value is applied to the LD 6, so that the optical transmission-reception signal is not only less absorbed through the LD 6 but also amplified therethrough, thereby achieving an optical signal transmitter-receiver module with high signal receiving sensitivity.

Third Embodiment

Figure 14:
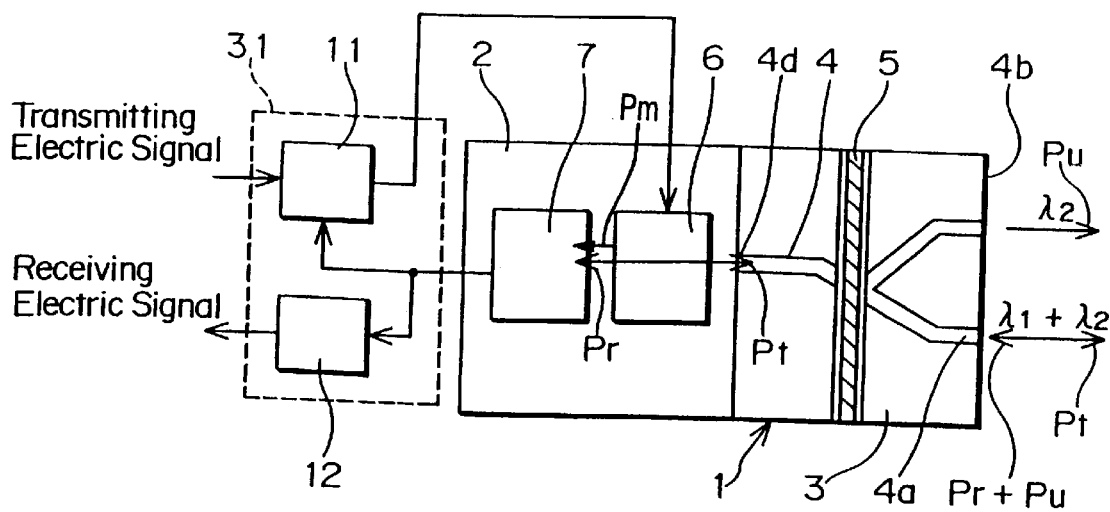
FIG. 14 a plan view of an optical signal transmitter-receiver module according to the third embodiment of the invention.

FIG. 14 a plan view of an optical signal transmitter-receiver module according to the third embodiment of the invention. In this figure, the parts essentially identical to those as shown in FIG. 2 are denoted with the same reference numerals.

Figure 15:
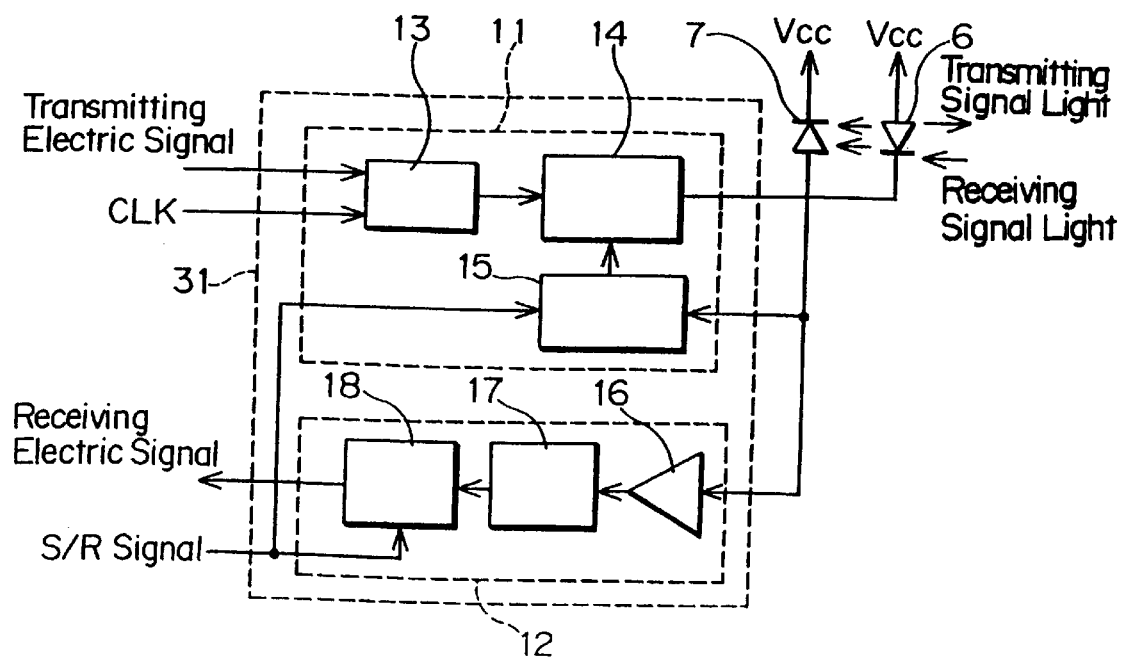
FIG. 15 is a structural illustration indicating the function of a signal transmission-reception circuit of the optical signal transmitter-receiver module according to the third embodiment of the invention.

FIG. 15 is a structural illustration indicating the function of a signal transmission-reception circuit of the optical signal transmitter-receiver module according to the third embodiment of the invention. In this figure, the parts essentially identical to those as shown in FIG. 4 are denoted with the same reference numerals. Similar to the first embodiment, the optical signal transmitter-receiver module 30 according to the third embodiment transmits and receives the optical signal having a wavelength of lambda 1 in the time sharing mode. However, it transfers the optical signal having a wavelength of lambda 2 to the outside, this optical signal being inputted asynchronously with transmission-reception of the optical signal having a wavelength of lambda 1.

As shown in FIG. 14, an optical signal transmitter-receiver module 30 according to the third embodiment is provided with a PLC 1 and a signal transmission-reception circuit 31. This signal transmission-reception circuit 31 is made up with a signal transmitting circuit 11 that drives an LD 6 in response to the inputted transmitting electric signal and keeps the light emission power of the LD 6 constant, and a signal reception circuit 12 that generates the receiving electric signal corresponding to the quantity of the optical signal Pr received by a PD 7. In short, the optical signal transmitter-receiver module 30 according to the third embodiment is made up by using the signal transmitting circuit 11 in place of the signal transmitting circuit 8 in the optical signal transmitter-receiver module 10 (first embodiment), connecting the PD 7 for receiving the optical signal Pr with the signal transmitting circuit 11 during the period of signal reception mode, and operating the PD 7 as a PD for monitoring the LD 6 in view of the optical signal Pm during the period of signal transmission mode.

The signal transmitting circuit 11 includes an F/F 13, an LD driving circuit 14, an automatic power control (referred to as APC hereinafter) circuit 15. The cathode electrode of the PD 7 is connected with a power source Vcc while the anode electrode of the same is connected with a preamplifier 16 of the signal receiving circuit 12 and also with the APC circuit 15 of the signal transmitting circuit 11.

The APC circuit 15 is provided with an input terminal for receiving the transmission-reception mode signal S/R inputted thereto, a monitoring current input terminal connected with the anode electrode of the PD 7, an output terminal for outputting a driving control signal for controlling the LD driving circuit 14. During the period of signal transmission mode, this APC circuit 15 controls the value of the driving current supplied from the LD driving circuit 14 to the LD 6 so as to keep the monitoring current outputted from the PD 7 constant, thereby keeping the light emission power of the LD 6 constant. The above monitoring current is such a current that is generated at the PD 7 when the PD 7 has received the light emitted from the LD 6, and corresponds to the light emission power of the LD 6.

Figure 16:
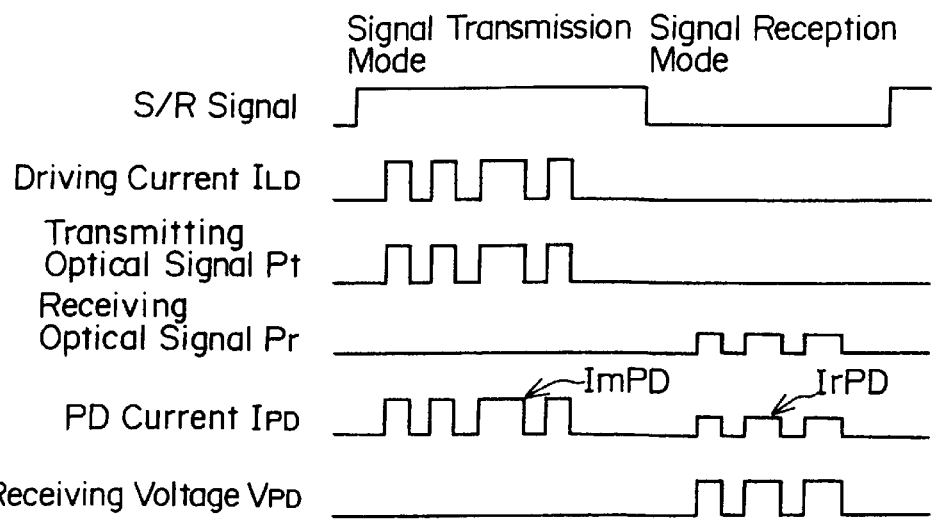
FIG. 16 is a timing chart for explaining the operation for transmitting and receiving the optical signal having a wavelength of lambda 1 in the optical signal transmitter-receiver module according to the third embodiment of the invention.

In the next, there will be described the operation of the optical signal transmitter-receiver module 30 according to the third embodiment of the invention. Similar to the first embodiment, the optical transmitter-receiver module 30 transmits and receives the optical signal having a wavelength of lambda 1 in the time sharing mode. The optical signal having a wavelength of lambda 2 is always inputted to the transmitting-receiving port 4a. The operation during the period of signal reception mode is identical to that of the first embodiment as described in the above. FIG. 16 is a timing chart for explaining the operation for transmitting and receiving the optical signal having a wavelength of lambda 1 in the optical signal transmitter-receiver module 30 according to the third embodiment. In this figure, the parts essentially identical to those shown as in FIG. 5 are indicated with the same reference numerals. During the period of signal reception mode, the PD 7 receives the optical signal Pr and operates as the optical signal receiving PD for converting it into the current IPD (receiving current IrPD). The APC circuit 15 of the signal transmitting circuit 11 forcibly stops the operation of the LD driving circuit 14, similar to the mode control circuit 9 in the first embodiment, thereby making the LD 6 emit no light.

During the period of signal transmission mode (the transmission-reception mode signal S/R is at "H" level) for transmitting the optical signal having a wavelength of lambda 1, the transmitting electric signal is latched on the bit by bit basis by the F/F 13 of the signal transmitting circuit 11 and is then inputted to the LD driving circuit 14. Then, the LD driving circuit 14 supplies the driving current ILD to the LD 6 in response to the transmitting electric signal as inputted from the F/F 13, thereby turning on and off the LD 6. In this way, the LD 6 may generate the optical signal Pt in correspondence with the transmitting electric signal.

The optical signal Pt emitted from the front face of the LD 6 comes in the signal transmission-reception port 4d, propagates through the optical waveguide passage 4, passes through the dielectric interference filter 5, is finally emitted from the input/output port 4a and is then transmitted to the object receiving end through the optical fiber. In this case, the optical signal Pt receives the optical loss of about 2[dB] while it is passing through the dielectric interference filter 5.

On one hand, the optical signal Pm emitted from the backside face of the LD 6 comes in the PD 7 and is converted into the current IPD (monitoring current ImPD) thereby. This monitoring current ImPD is such a current as has a magnitude corresponding to the light emission power of the LD 6 and is inputted to the APC circuit 15 of the signal transmitting circuit 11. Then, this APC circuit 15 compares the inputted monitoring current ImPD with a reference value. If the comparison indicates that the current ImPD is smaller than the reference value, the APC circuit 15 increases the driving current ILD, and if the current ImPD is larger than the reference value, the APC circuit 15 decreases the driving current ILD. In this way, the APC circuit 15 controls the driving current ILD supplied from the LD driving circuit 14 to the LD 6 such that the monitoring current ImPD becomes constant, thereby keeping the light emission power of the LD 6 constant against variation in temperature and others. Also, during the period of signal transmission mode (transmission-reception mode signal S/R is at "H" level), the LIM circuit 18 of the signal receiving circuit 12 is made not to output any receiving electric signal. Therefore, any erroneous signal caused by the monitoring current ImPD inputted to the preamplifier 16 can not be involved in the receiving electric signal.

As discussed in the above, according to the third embodiment of the invention, the PD 7 may operate as the PD for monitoring the LD 6 in view of the optical signal emitted therefrom during the period of signal transmission mode. Also, it may operate as the PD for receiving the optical signal and converting it into the receiving current during the period of signal reception mode. Consequently, in case of controlling the LD 6 so as to keep its light emission power constant, there is no need for two of PD's to be separately prepared according to their different purposes i.e. one for monitoring the LD in view of the transmitting signal (Pt) and the other for receiving the optical signal (Pr), thus enabling the number of PD to be reduced to 1 from 2. Consequently, the number of optical parts can be reduced and at the same time, the area of the expensive PLC substrate can be made narrower, thereby enabling the optical signal transmitter-receiver module to be realized at a low cost.

Fourth Embodiment

Figure 17:
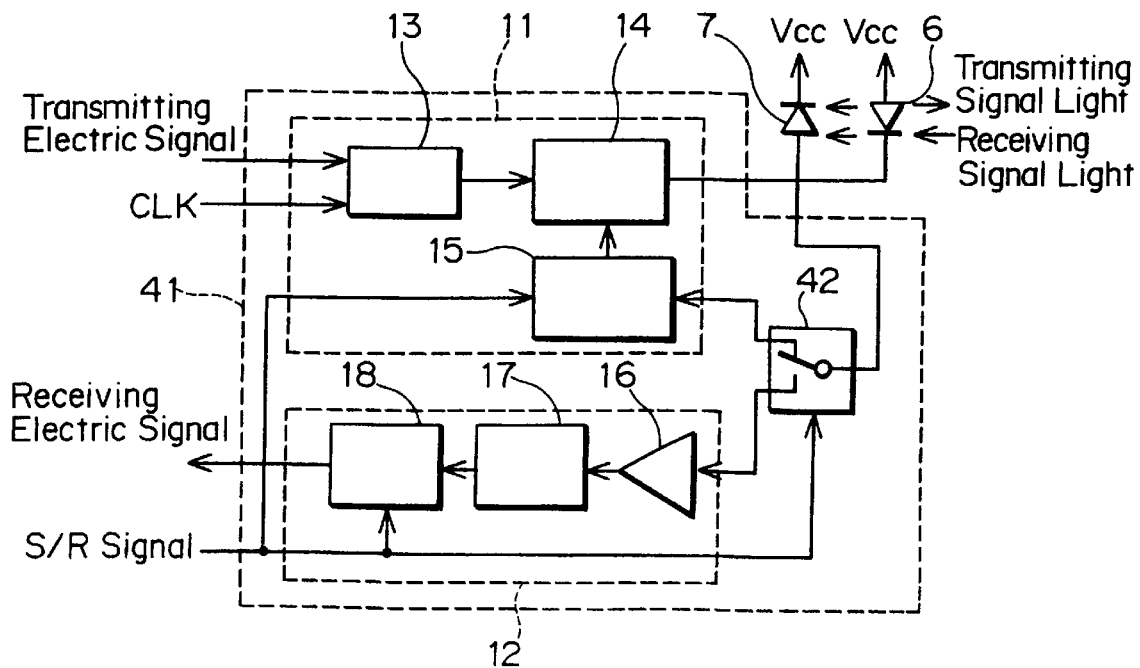
FIG. 17 is a structural illustration indicating the function of a signal transmission-reception circuit of an optical signal transmitter-receiver module according to the fourth embodiment of the invention.

FIG. 17 is a structural illustration indicating the function of a signal transmission-reception circuit of an optical signal transmitter-receiver module according to the fourth embodiment of the invention. In this figure, the parts essentially identical to those as shown in FIG. 15 are indicated with the same reference numerals. Similar to the first embodiment, the optical signal transmitter-receiver module according to the fourth embodiment transmits and receives an optical signal having a wavelength of lambda 1 in the time sharing mode. However, it transfers the optical signal having a wavelength of lambda 2 to the outside, this optical signal being inputted asynchronously with transmission-reception of the optical signal having a wavelength of lambda 1.

The optical signal transmitter-receiver module according to the fourth embodiment is composed of a PLC 1 (FIG. 14) and a signal transmission-reception circuit 41. This signal transmission-reception circuit 41 includes a signal transmitting circuit 11, a signal receiving circuit 12 and a switching circuit 42. In short, the optical signal transmitter-receiver module according to the fourth embodiment is made up by adding the switching circuit 42 to the optical signal transmitter-receiver module 30 according to the third embodiment.

During the period of signal transmission mode (the transmission-reception mode signal S/R is at "H" level), the switching circuit 42 acts to connect the anode electrode of the PD 7 only with the APC circuit 15 while it acts to define an open circuit between the PD 7 and the preamplifier 16. On one hand, during the period of signal reception mode (the transmission-reception mode signal S/R is at "L" level), the switching circuit 42 acts to connect the anode electrode of the PD 7 only with the preamplifier 16 while it acts to define an open circuit between the PD 7 and the APC circuit 15.

In the next, there will be described the operation of the optical signal transmitter-receiver module according to the fourth embodiment. Similar to the first embodiment, the optical transmitter-receiver module according to the fourth embodiment transmits and receives optical signals having a wavelength of lambda 1 in the time sharing mode. The optical signal having a wavelength of lambda 2 is always inputted to the signal transmission-reception port 4a. The signal transmission-reception operation of PLC 1 is identical to that of the third embodiment as described in the above, thus explanation of it being not repeated.

First, during the period of signal transmission mode for transmitting the optical signal having a wavelength of lambda 1 (the transmission-reception mode signal S/R is at "H" level), the switching circuit 42 connects the PD 7 with the APC circuit 15 while isolating the PD 7 from the preamplifier 16. With this, the PD 7 receives the transmitting optical signal generated by the LD 6 and outputs the monitoring current. Different from the third embodiment, this current is entirely inputted to the APC circuit 15 without allowing any part of it to flow into the preamplifier 16. Similar to the third embodiment, however, the APC circuit 15 controls the LD driving circuit 14. During this period of signal transmission mode, as the LIM circuit 18 is made not to output the receiving electric signal so that there is no chance that any erroneous signal caused during the period of signal transmission mode, is involved in the receiving electric signal.

Next, during the period of signal reception mode for receiving the optical signal having a wavelength of lambda 1 (the transmission-reception mode signal S/R is at "L" level), the switching circuit 42 connects the PD 7 with the preamplifier 16 while isolating the PD 7 from the APC circuit 15. With this, the PD 7 receives the receiving optical signal and outputs a receiving current. Different from the third embodiment, this current is entirely inputted to the preamplifier 16 without allowing any part of it to flow into the APC circuit 15 and converted into the receiving voltage by the preamplifier 16. Similar to the first embodiment, this receiving voltage is converted into the receiving electric signal by the ATC circuit 17 and the LIM circuit 18. During this period of signal reception mode, the APC circuit 15 forcibly stops the operation of the LD driving circuit 14 so that no light is emitted by the LD 6.

As explained in the above, according to the fourth embodiment, there is provided the switching circuit 42 that selectively connects the PD 7 with either the APC circuit 15 or the preamplifier 16. With this, the current from the PD 7 can entirely flow only into either the APC circuit 15 or the preamplifier 16. Therefore, the current from the PD 7 does not receive any loss, and the PD 7 can be commonly used for monitoring the LD 6 as well as for receiving the optical signal, without lowering the optical signal receiving sensitivity.

Fifth Embodiment

Figure 18:
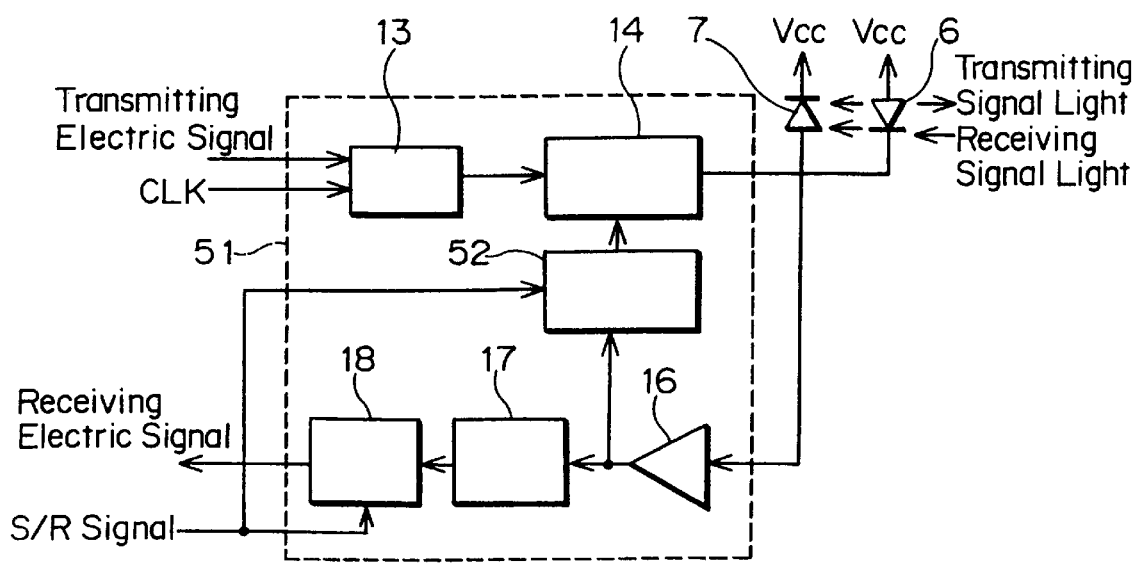
FIG. 18 is a structural illustration indicating the function of a signal transmission-reception circuit of an optical signal transmitter-receiver module according to the fifth embodiment of the invention.

FIG. 18 is a structural illustration indicating the function of a signal transmission-reception circuit of an optical signal transmitter-receiver module according to the fifth embodiment of the invention. In this figure, the parts essentially identical to those as shown in FIG. 15 is denoted with Like reference numerals. Similar to the first embodiment, the optical signal transmitter-receiver module according to the fifth embodiment transmits and receives the optical signal having a wavelength of lambda 1 in the time sharing mode. However, it transfers the optical signal having a wavelength of lambda 2 to the outside, this optical signal being inputted asynchronously with the transmission-reception of the optical signal having a wavelength of lambda 1.

The optical signal transmitter-receiver module according to the fifth embodiment is provided with a PLC 1 (FIG. 14) and a signal transmission-reception circuit 51, which includes a F/F 13, an LD driving circuit 14, an APC circuit 52, a preamplifier 16 (current-voltage conversion circuit), an ATC circuit 17, and a LIM circuit 18. In short, the signal transmission-reception circuit 51 is made up by substituting the APC circuit 52 for the APC circuit 15 of the signal transmission-reception circuit 31 (FIG. 15) in the above third embodiment.

The anode electrode of the PD 7 is connected only with the preamplifier 16, not with the APC circuit 52. The APC circuit 52 is provided with an input terminal to which the transmission-reception mode signal S/R is inputted, a monitoring voltage input terminal connected with the output terminal of the preamplifier 16, and with an output terminal for outputting a drive control signal for controlling the LD driving circuit 14. During the period of signal transmission mode, the APC circuit 52 controls the value of the driving current supplied from the LD driving circuit 14 to the LD 6 such that the monitoring voltage outputted from the preamplifier 16 is kept constant, thereby keeping the light emission power of the LD 6 constant. The above monitoring voltage is a voltage that is obtained by converting the monitoring current generated at the PD 7 when PD 7 receives the light from the LD 6, by means of the preamplifier 16, and that corresponds to the light emission power of the LD 6.

In the next, there will be explained the operation of the optical signal transmitter-receiver module according to the fifth embodiment of the invention. Similar to the first embodiment, the optical signal transmitter-receiver module transmits and receives the optical signal having a wavelength of lambda 1 in the time sharing mode. Also, the optical signal having a wavelength of lambda 2 always comes in the input/output port 4a. As the signal transmission-reception operation of the PLC 1 is identical to that of the third embodiment as described in the above, the explanation thereof is not repeated.

First, during the period of signal transmission mode for transmitting the optical signal having a wavelength of lambda 1 (the transmission-reception mode signal S/R is at "H" level), the PD 7 receives the transmitting optical signal generated by the LD 6 and outputs the monitoring current. This current is entirely inputted to the preamplifier 16 and is converted into the monitoring voltage thereby. This monitoring voltage is inputted to the APC circuit 52. Then, the APC circuit 52 compares the inputted monitoring voltage with a reference value. If this comparison indicates that the monitoring voltage is smaller than the reference value, the APC circuit 52 raises the driving current supplied to the LD 6, and if the monitoring voltage is larger than the reference value, the APC circuit 52 lowers the driving current. In this way, the APC circuit 52 controls the driving current supplied from the LD driving circuit 14 to the LD 6 such that the monitoring voltage becomes constant, thereby keeping the light emission power of the LD 6 constant against variation in temperature and others. Also, during the period of signal transmission mode, the LIM circuit 18 is made not to output any receiving electric signal. Therefore, any erroneous signal caused during the period of signal transmission mode, can not be involved in the receiving electric signal.

Next, during the period of signal reception mode for receiving the optical signal having a wavelength of lambda 1 (the transmission-reception mode signal S/R is at "L" level), the PD 7 receives the receiving optical signal and outputs a receiving current. This current is entirely inputted to the preamplifier 16 and converted into the receiving voltage thereby. Similar to the first embodiment, this receiving voltage is converted into the receiving electric signal by the ATC circuit 17 and the LIM circuit 18. During this period of signal reception mode, the APC circuit 52 forcibly stops the operation of the LD driving circuit 14 so that no light is emitted by the LD 6.

As discussed in the above, according to the fifth embodiment of the invention, as the output voltage of the preamplifier 16 is inputted only to the APC circuit 52, the current from the PD 7 can flow only into the preamplifier 16. Therefore, the current from the PD 7 does not receive any loss and can be commonly used for monitoring the LD 6 as well as for receiving the optical signal, without lowering the optical signal receiving sensitivity.

Sixth Embodiment

Figure 19:
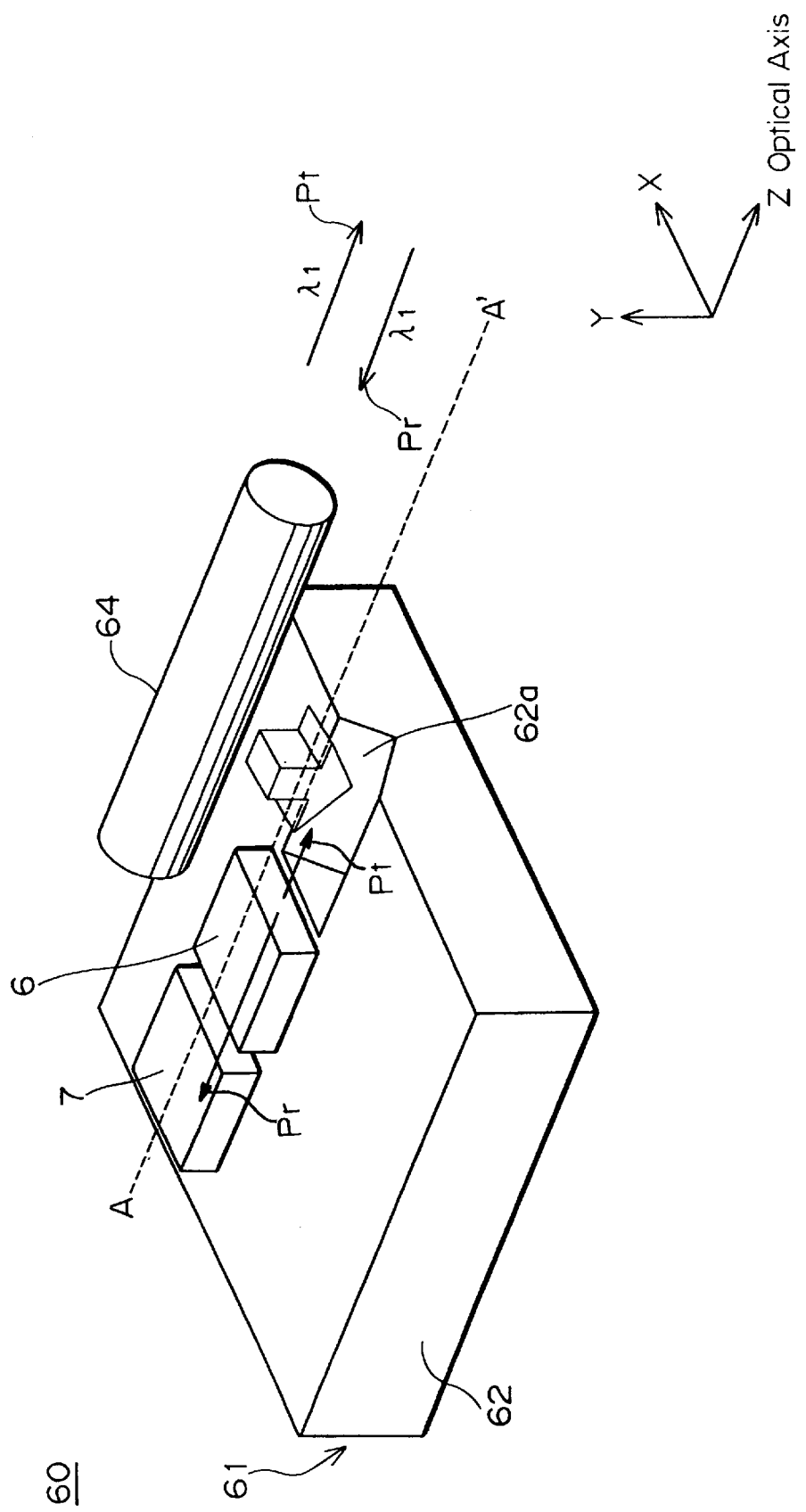
FIG. 19 is a perspective view of an optical signal transmitter-receiver module according to the sixth embodiment of the invention.

FIG. 19 is a perspective view of an optical signal transmitter-receiver module according to the sixth embodiment of the invention. FIG. 20 is a cross sectional view taken on line A–A' in FIG. 19. In these figures, the parts essentially identical to those as shown in FIGS. 1 through 3 have the same reference numerals. The optical transmitter-receiver 60 according to the sixth embodiment transmits and receives the optical signal having a wavelength of lambda 1 in the time sharing mode. In this case, the value of the wavelength lambda 1 is 1.3 micrometers, for instance.

The optical signal transmitter-receiver module 60 according to the sixth embodiment is provided with a PLC 61 and a signal transmission-reception circuit (not shown), which is identical to, for instance, the signal transmission-reception circuit 19 (see FIG. 4) in the above first embodiment.

The PLC 61 is composed of a Si substrate 62, an LD 6 generating the optical signal Pt (first optical signal), and a PD 7 receiving the optical signal Pr (second optical signal).

The LD 6 and the PD 7 are mounted on the Si substrate 62. The LD 6 and an optical fiber 64 (e.g. single mode optical fiber) are required to be positioned with high precision with respect to all directions i.e. X-axis, Y-axis, and Z-axis (optical axis) as shown in FIG. 19. For this, there is formed on the surface of the Si substrate 62 a groove 62a having a V-shaped cross section (referred to as V-shaped groove hereinafter) for precisely positioning the optical fiber 64. This V-shaped groove 62a of the Si substrate 62 is precisely formed along a Si crystal surface by means of the wet etching method, for instance. The optical fiber 64 can be precisely positioned against the LD 6 by putting it in the V-shaped groove 62a. A material such as resin or the like may be applied to each optical coupling portion between the optical fiber 64 and the LD 6 and also between the LD 6 and the PD 7 in order to take matching of the refraction index therebetween. For instance, if the optical coupling portion is molded with resin and the refraction indices of two parts on the both sides of the optical coupling portion are matched with each other, the reflection loss at the end faces (light incidence or emission end) can be reduced.

The LD 6 is mounted on the Si substrate 62a such that its front face is located in the vicinity of the optical fiber 64 mounted on the V-shaped groove 62a. The LD 6 includes a waveguide layer 6c that includes an active layer 6a generating the optical signal Pt and a clad layer 6b formed of upper and lower layers sandwiching the active layer 6a therebetween. The optical signal Pt emitted from the front face of the LD 6 is inputted to the optical fiber 64. This optical fiber 64 is positioned such that the optical signal Pr as transmitted is inputted to the waveguide layer 6c (not only to the active layer 6a but also to clad layer 6b). The active layer 6a absorbs the optical signal Pr (as an absorption layer for the incident light having a wavelength of lambda 1) while clad layer 6b allows the optical signal Pr to pass therethrough (as transparent layer for the incident light having a wavelength of lambda 1). The active layer 6a is made of InGaAsP while clad layer 6b is InP, for instance.

In the next, there will be explained the operation of the optical signal transmitter-receiver module 60 according to the sixth embodiment. The optical signal transmitter-receiver module 60 transmits and receives the optical signal having a wavelength of lambda 1 in the time sharing mode.

During the period of signal transmission mode for transmitting the optical signal having a wavelength of lambda 1, the driving signal in response to the transmitting electric signal is supplied to the LD 6 through the signal transmission-reception circuit, thereby making the active layer 6a of the LD 6 generate the optical signal Pt. This optical signal Pt emitted from the front face of the LD 6 comes in the optical fiber 64 and is further transmitted toward the object receiving end.

On one hand, during the period of signal reception mode for receiving the optical signal having a wavelength of lambda 1, the optical signal Pr transmitted through the optical fiber 64 comes in the waveguide layer 6c of the LD 6 and passes it through, and is then emitted from the backside face of the LD 6. This optical signal Pr is received by the PD 7 and then converted into the receiving current thereby. This receiving current is further converted into the receiving electric signal by the signal transmission-reception circuit. In the waveguide layer 6c of the LD 6, the active layer 6a absorbs the incident light having a wavelength of lambda 1 while the clad layer 6b permits it to pass therethrough. Namely, in the signal receiving operation as mentioned above, the optical signal Pr incident on the active layer 6a of the waveguide layer 6c is absorbed thereby while the optical signal Pr incident on the clad layer 6b is allowed to pass the waveguide layer 6c and is further led to the PD 7.

As mentioned above, the optical signal transmitter-receiver module according to the sixth embodiment is constructed such that the PD 7 is positioned behind the LD 6 generating the optical signal Pt and the optical signal Pr passing through the waveguide layer 6c of the LD 6 is received by the PD 7. Consequently, there is no need to prepare any optical waveguide passage for guiding the optical Pt from the LD 6 to the optical fiber 64 or for guiding the optical signal Pr from the optical fiber 64 to the PD 7. The LD 6 and the optical fiber 64 are allowed to make a direct optical coupling therebetween. In order to form a quartz layer on the Si substrate of the PLC and an optical waveguide passage in that quartz layer, there has been required a very complex and costly manufacturing process so far. Accordingly, the manufacturing cost can be advantageously reduced by eliminating the process for forming such optical waveguide passage. Furthermore, disuse of the optical waveguide passage enables the PLC to become more compact.

It may be possible to make use of the signal transmission-reception circuit of the above second embodiment as the signal transmission-reception circuit in this sixth embodiment. If so arranged, during the period of signal reception mode, the optical signal Pr may be amplified by the active layer 6a of the LD 6 supplied with the bias current thereto. Furthermore, the above sixth embodiment may make use of the signal transmission-reception circuit of the above third embodiment. In this case, the PD 7 may be used as the PD for monitoring the LD 6 during the period of signal transmission mode. Still further, in this sixth embodiment, there is used the Si substrate that is provided with the V-shaped groove precisely positioning the optical fiber. However, it is not always needed for the Si substrate for mounting the LD and the PD to be provided with the V-shaped groove.

Seventh Embodiment

Figure 21:
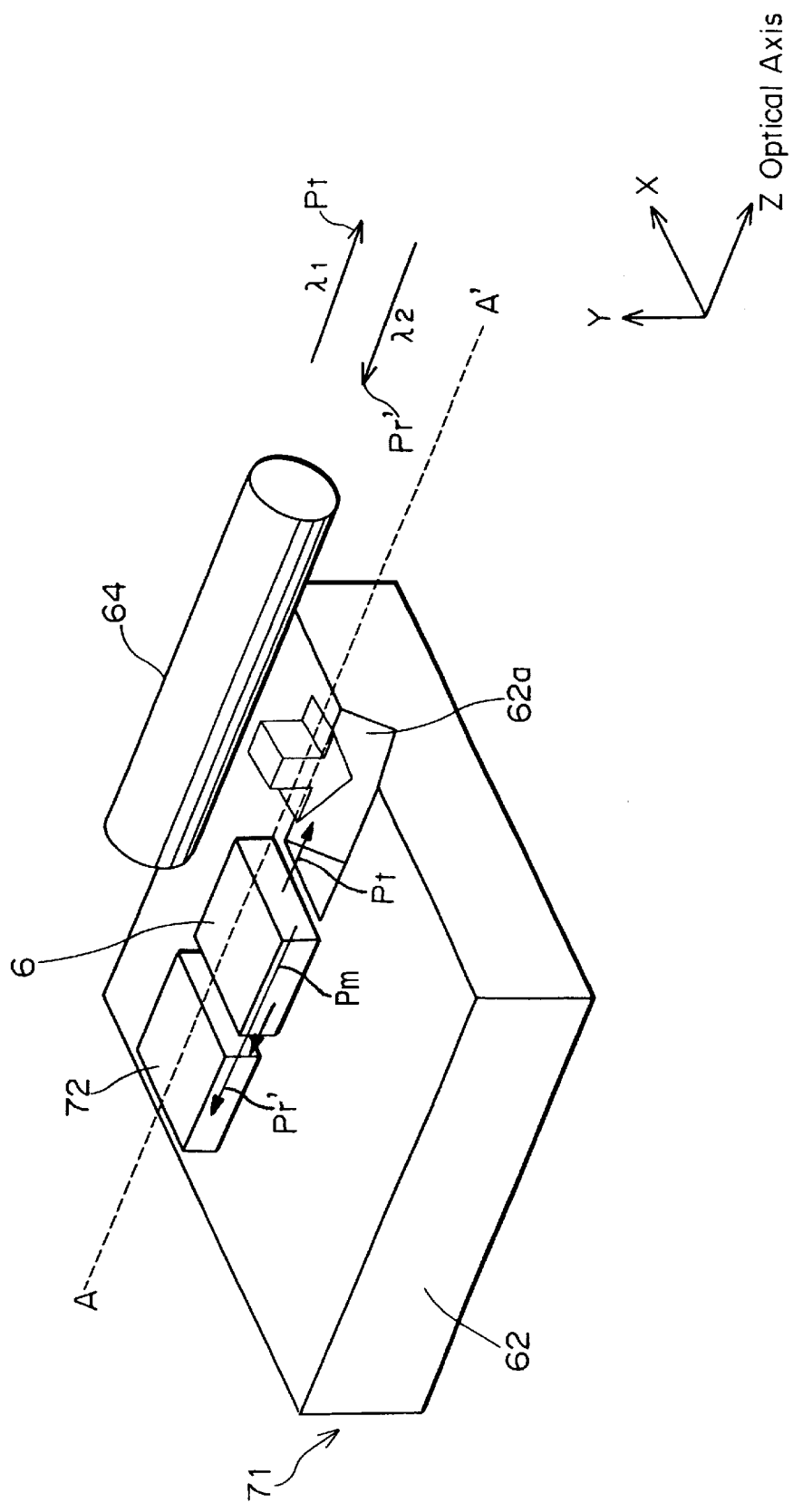
FIG. 21 is a perspective view of an optical signal transmitter-receiver module according to the seventh embodiment of the invention; p
Figure 22:
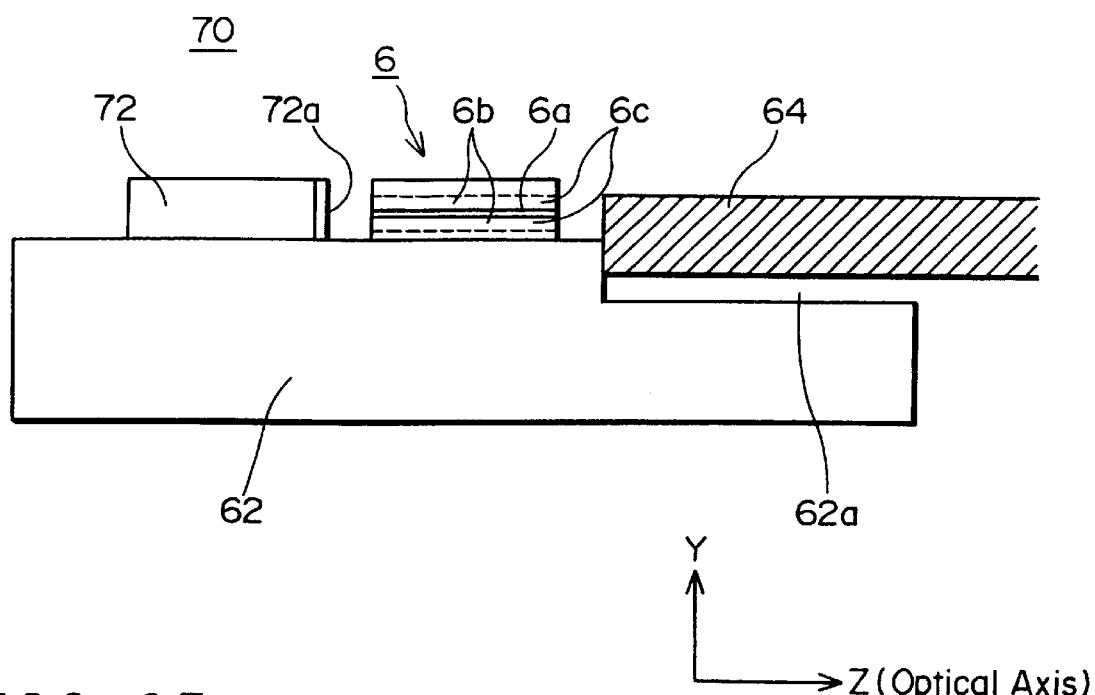
FIG. 22 is a cross sectional view taken on line A–A' in FIG. 21.

FIG. 21 is a perspective view of an optical signal transmitter-receiver module according to the seventh embodiment of the invention. FIG. 22 is a cross sectional view taken on line A–A' in FIG. 21. In these figures, the parts essentially identical to those as shown in FIGS. 19 and 20 are indicated with the same reference numerals. The optical transmitter-receiver 70 according to the seventh embodiment of the invention transmits the optical signal Pt and receives the optical signal having a wavelength of lambda 2 asynchronously with transmission of the optical signal Pt. Accordingly, it happens that the optical transmitter-receiver 70 transmits the optical signal Pt and simultaneously receives the optical signal, or it transmits the optical signal Pt and receives the receiving optical signal having a wavelength of lambda 2 in the time sharing mode.

In the following description and the accompanying drawings, the receiving optical signal having a wavelength of lambda 2 is indicated as "optical signal Pr'."

The ATM-PDS system is a typical example of the system that asynchronously transmits and receives two optical signal (optical signal Pt and optical signal Pr') having wavelengths different from each other. In this ATM-PDS system, two optical signals, one being an ascending optical signal having a wavelength of lambda 1 that is transmitted from the optical signal transmitter-receiver module 70 installed on the system subscriber side to the central office, and the other being a descending optical signal having a wavelength of lambda 2 that is transmitted from the central office to the above optical signal transmitter-receiver module 70, are transmitted and received not in the time sharing mode but in the asynchronous mode, so that it sometimes happens that the ascending optical signal having a wavelength of lambda 1 mixedly co-exists with the descending optical signal having a wavelength of lambda 2. Under such situation, the optical signal transmitter-receiver module 70 is transmitting the optical signal Pt while receiving the optical signal Pr'.

The optical signal transmitter-receiver module 70 is provided with a PLC 71 and a signal transmission-reception circuit (not shown). This circuit is the signal transmission-reception circuit 19 of the above first embodiment in which the mode control circuit 9 and the LIM circuit 18 are made to constantly operate.

The PLC 71 is composed of a Si substrate 62, an LD 6 generating the optical signal Pt (first optical signal), and a PD 72 receiving the optical signal Pr' (second optical signal). A V-shaped groove 62a is provided on the Si substrate 62. Also, the LD 6 and the PD 72 are mounted on the surface of the Si substrate 62.

The LD 6 is arranged on the Si substrate 62 such that its front face is located in the vicinity of the optical fiber 64 that is directly mounted on the V-shaped groove 62a. The LD 6 includes a waveguide layer 6c that includes an active layer 6a generating the optical signal Pt and a clad layer 6b formed of upper and lower layers sandwiching the active layer 6a therebetween. The optical signal Pt emitted from the front face of the LD 6 comes in the optical fiber 64. This optical fiber 64 is positioned such that the optical signal Pr' as transmitted comes in the waveguide 6c (i.e. coming not only in the active layer 6a but also in the clad layer 6b). The active layer 6a absorbs the light having a wavelength of lambda 2 when the wavelength lambda 2 is shorter than the wavelength lambda 1 while the clad layer 6b allows the light having a wavelength of lambda 2 to pass therethrough regardless of the wavelength lambda 2 being longer or shorter than the wavelength lambda 1.

The PD 72 is arranged on the Si substrate 62 such that its front face is located so as to stand close to the backside face of the LD 6. The front face of the PD 72 is coated with an optical thin film 72a that acts so as to reflect the light having a wavelength of lambda 1 but to permit the light having a wavelength of lambda 2 to pass therethrough. This optical thin film 72a is formed, for instance, by piling up a plurality of dielectric thin films having different refraction indices. The front face of the PD 72 is hit by the optical signal Pt emitted from the backside face of the LD6 and also by the receiving optical signal having a wavelength of lambda 2 passing through the waveguide layer 6c of the LD 6 and then emitted from the backside face of the LD 6. However, the optical signal Pt is reflected by the optical thin film 72a, and only the receiving optical signal having a wavelength of lambda 2 is received by the PD 72.

Figure 23:
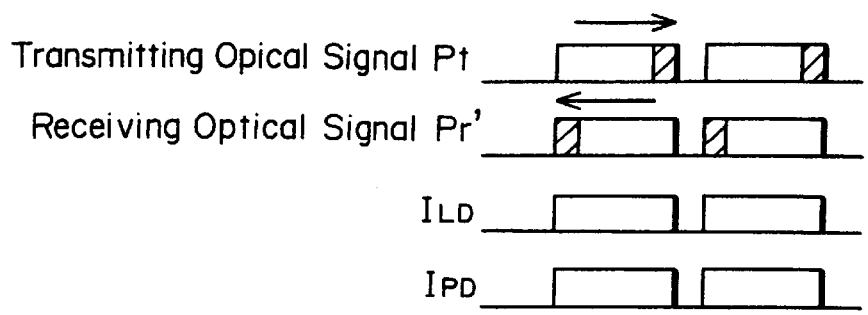
FIG. 23 is a timing chart for explaining the signal transmission-reception operation in the optical signal transmitter-receiver module according to the seventh embodiment of the invention.

In the next, there will be explained the operation of the optical signal transmitter-receiver module according to the seventh embodiment of the invention. FIG. 23 is a timing chart for explaining the signal transmission-reception operation in the optical signal transmitter-receiver module 70 according to the seventh embodiment of the invention. Here, it is assumed that the optical signal transmitter-receiver module 70 asynchronously transmits and receives the optical signal (Pt) having a wavelength of lambda 1 and the optical signal (Pr') having a wavelength of lambda 2. These wavelengths lambda 1 and lambda 2 are 1.3 micrometers and 1.5 micrometers, respectively.

In case of transmitting the optical signal having a wavelength of lambda 1, the driving current ILD corresponding to the transmitting electric signal is supplied to the LD 6 by the signal transmission-reception circuit, thereby making the active layer 6a of the LD 6 emit the optical signal Pt. This optical signal Pt emitted from the front face of the LD 6 and comes in the optical fiber 64 and is then transmitted to the object receiving end.

On one hand, in case of receiving the optical signal having a wavelength of lambda 2, the optical signal Pr' received through the optical fiber 64 comes in and passes through the waveguide layer 6c of the LD 6 and is then emitted from the backside face of the LD6. This optical signal Pr' passes through the optical thin film 72a of the PD 72 and is received by the PD 72, and is then converted into the receiving current IPD thereby. This receiving current IPD is further converted into the receiving electric signal by the signal transmission-reception circuit.

In the above-mentioned signal transmission-reception operation, when the wavelength lambda 2 is longer than the wavelength lambda 1 and the active layer 6a of the LD 6 acts as the transparent layer against the light having a wavelength of lambda 2, the optical signal Pr' passes through the active 6a and the clad layer 6b and is then led to the PD 72. In contrast, in case the optical signal Pt and the optical signal Pr' are transmitted and received in the time sharing mode, the wavelength lambda 2 is shorter than the wavelength lambda 1, and the active layer 6a of the LD 6 acts as the absorption layer, the optical signal Pr' passes through the clad layer 6b and is led to the PD 72.

In the above-mentioned signal transmission-reception operation, while the LD 6 is emitting the optical signal Pt, the optical signal Pr' is emitted from the backside face of the LD 6 along with the optical signal Pm. However, this optical signal Pm is reflected by the optical thin film 72a coating the front face of the PD 72, so that it can not come in the PD 72.

As described in the above, the optical signal transmitter-receiver according to the seventh embodiment is constructed such that the PD 72 is arranged behind the LD 6 generating the optical signal Pt, the front face of the PD 72 is coated with the optical thin film 72a capable of reflecting the light having a wavelength of lambda 1, and the PD 72 receives the optical signal Pr' passing through the waveguide layer 6c of the LD 6. Therefore, there is no need to prepare any optical waveguide passage for guiding the optical Pt from the LD 6 to the optical fiber 64 or for guiding the optical signal Pr' from the optical fiber 64 to the PD 72. The LD 6 and the optical fiber 64 are allowed to make a direct optical coupling therebetween. In order to form a quartz layer on the Si substrate of the PLC and an optical waveguide passage in that quartz layer, there has been required so far a very complex and costly manufacturing process. Accordingly, the manufacturing cost can be advantageously reduced by eliminating the process for forming such optical waveguide passage. Furthermore, disuse of the optical waveguide passage enables the PLC to become more compact.

Figure 24:
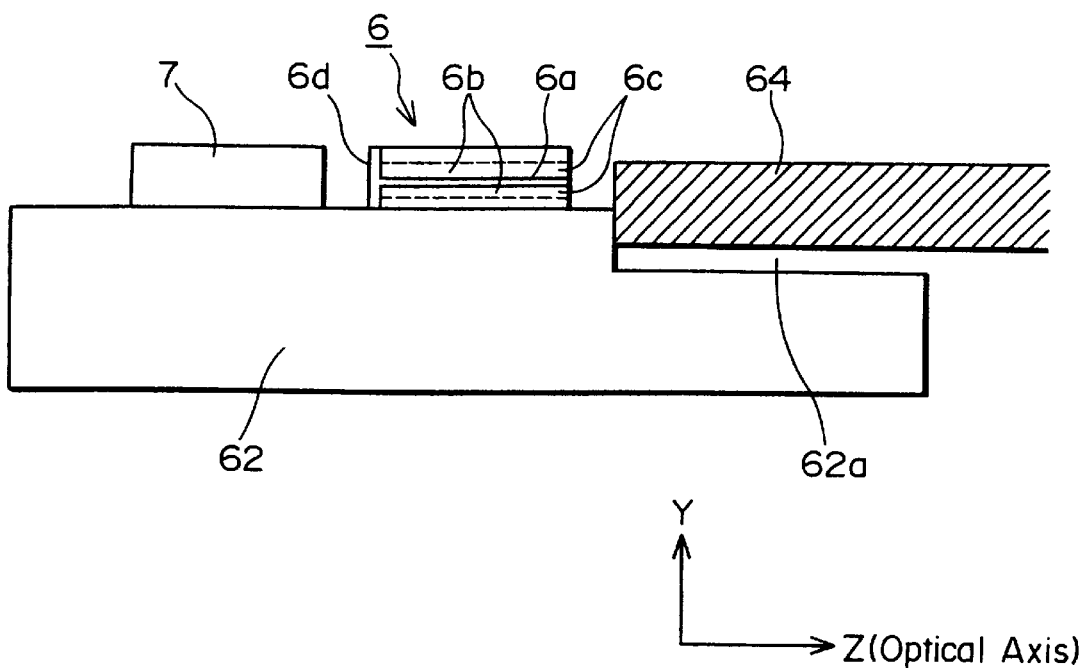
FIG. 24 is a cross sectional view of another optical signal transmitter-receiver module according to the seventh embodiment of the invention.

In the above seventh embodiment, the optical thin film 72a capable of reflecting the light having a wavelength of lambda 1 and allowing the light having a wavelength of lambda 2 to pass therethrough is provided so as to coat the front face of the PD 72. As shown in FIG. 24, however, an optical thin film 6d capable of reflecting the light having a wavelength of lambda 1 and allowing the light having a wavelength of lambda 2 to pass therethrough may be provided so as to coat the backside face of the LD 6. Also, in the seventh embodiment, there is used the Si substrate that is provided with the V-shaped groove for positioning the optical fiber. However, it is not always needed for the Si substrate for mounting the LD and the PD to be provided with the V-shaped groove.

Eighth Embodiment

Figure 25:
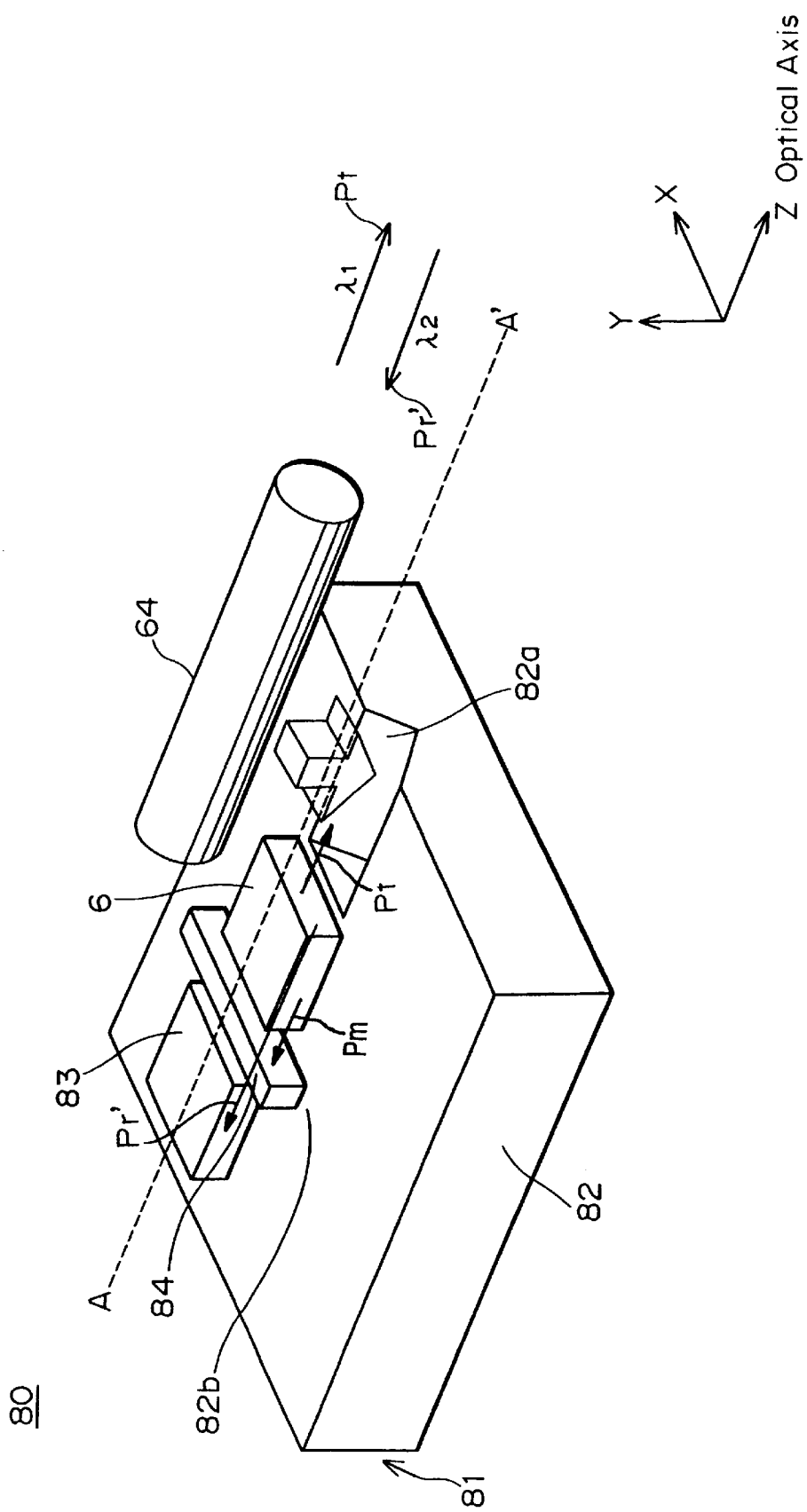
FIG. 25 is a perspective view of an optical signal transmitter-receiver module according to the eighth embodiment of the invention.
Figure 26:
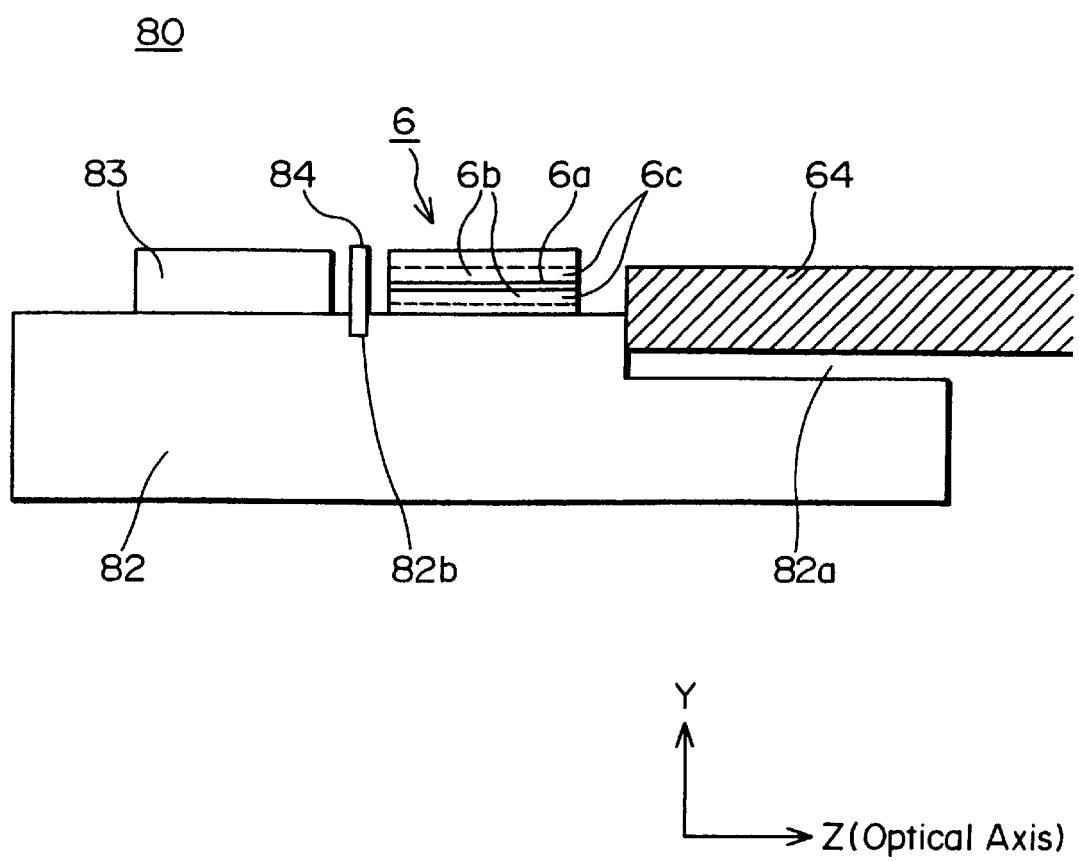
FIG. 26 is a cross sectional view taken on line A–A' in FIG. 25.

FIG. 25 is a perspective view of an optical signal transmitter-receiver module according to the eighth embodiment of the invention. FIG. 26 is a cross sectional view taken on line A–A' in FIG. 25. In these figures, the parts essentially identical to those as shown in FIGS. 21 and 22 are indicated with the same reference numerals. Similar to the seventh embodiment, the optical transmitter-receiver 80 according to the eighth embodiment transmits the optical signal Pt and receives the optical signal Pr' asynchronously with transmission of the optical signal Pt, or transmits and receives the optical signal Pt and the optical signal Pr' in the time sharing mode.

The optical signal transmitter-receiver module 80 is provided with a PLC 81 and a signal transmission-reception circuit (not shown). This signal transmission-reception circuit is the signal transmission-reception circuit 19 of the above first embodiment in which the mode control circuit 9 and the LIM circuit 18 are made to constantly operate.

The PLC 81 is made up with a Si substrate 82, an LD 6 generating the optical signal Pt (first optical signal), and a PD 83 receiving the optical signal Pr' (second optical signal) and a dielectric interference filter 84. On the Si substrate 82, there are provided a V-shaped groove 82a (identical to the V-shaped groove 62 in FIG. 21) for precisely positioning the optical fiber 64, and a slot 82b for receiving the dielectric interference filter 84 to be inserted therein. Also, the LD 6 and the PD 83 are mounted on the surface of the Si substrate 82.

The LD 6 is arranged on the Si substrate 82 such that its front face is located in the vicinity of the optical fiber 64 that is directly mounted on the V-shaped groove 62a. This LD 6 includes a waveguide layer 6c that includes an active layer 6a generating the optical signal Pt and a clad layer 6b formed of upper and lower layers sandwiching the active layer 6a therebetween. The optical signal Pt emitted from the front face of the LD 6 comes in the optical fiber 64. This optical fiber 64 is positioned such that the optical signal Pr' as transmitted comes in the waveguide 6c (i.e. coming not only in the active layer 6a but also in the clad layer 6b). The active layer 6a absorbs the light having a wavelength of lambda 2 when the wavelength lambda 2 is shorter than the wavelength lambda 1 while the clad layer 6b allows the light having a wavelength of lambda 2 to pass therethrough regardless of the wavelength lambda 2 being longer or shorter than the wavelength lambda 1.

The PD 83 is arranged on the Si substrate 82 such that its front face is located so as to stand close to the backside face of the LD 6. This PD 83 receives the optical signal Pr' that is emitted from the optical fiber 64 and passes through the waveguide 6c of the LD 6 and the dielectric interference filter 84.

The dielectric interference filter 84 is inserted and fixed in the slot 82b that is formed on the Si substrate 82 so as to be located between the LD 6 and the PD 83. This dielectric interference film filter 84 is an optical filter that is formed by piling up a plurality of dielectric layers having different refraction indices, and it acts so as to reflect the light having a wavelength of lambda 1 while it permits the light having a wavelength of lambda 2 to pass therethrough. The optical signal Pt and the optical signal Pr' are emitted from the backside face of the LD 6. However, the optical signal Pt is reflected by the dielectric interference filter 84, and only the optical signal Pr' is permitted to pass through the dielectric interference filter 84 and come in the PD 83.

In short, in the optical signal transmitter-receiver module 80, the optical filter (dielectric interference filter 84) is used as an optical means that reflects or absorbs the light having a wave length of lambda 1 and allows the light having a wave length of lambda 2 to pass therethrough, in place of the thin film 72a used in the optical signal transmitter-receiver module 70 according to the above seventh embodiment. A material such as resin or the like may be applied to each optical coupling portion between the optical fiber 64 and the LD 6, between the LD 6 and the dielectric interference filter 84, and also between the dielectric interference filter 84 and the PD 83 in order to take matching of the refraction index therebetween. The above-mentioned optical filter is not limited to the dielectric interference filter. It may be a thing having such a wavelength characteristic that reflects or absorbs the light having a wavelength of lambda 1 and passes the light having a wavelength of lambda 2.

In the next, there will be explained the operation of the optical signal transmitter-receiver module 80 according to the eighth embodiment. Here, similar to the above seventh embodiment, it is assumed that the optical signal transmitter-receiver module 80 asynchronously transmits and receives the optical signal having a wavelength of lambda 1 and the optical signal having a wavelength of lambda 2.

The optical signal Pt generated by the active layer 6a of the LD 6 is emitted from the front face of the LD 6 and comes in the optical fiber 64, and is finally directed to the object receiving end. During the period of signal reception mode, the optical signal Pr' as transmitted through the optical fiber 64 comes in the waveguide layer 6c of the LD 6, passes through the waveguide layer 6c of the LD 6 and the dielectric interference filter 84 as well, and finally comes in the PD 83.

In the above signal transmission-reception operation, while the LD 6 is emitting the optical signal Pt, the optical signal Pr' is emitted from the backside face of the LD 6 along with the optical signal Pm. However, this optical signal Pm is reflected by the dielectric interference filter 84, so that it can not come in the PD 83.

As described in the above, the optical signal transmitter-receiver according to the eighth embodiment is constructed such that the PD 83 is arranged behind the LD 6 generating the optical signals Pt and Pm, the dielectric interference filter 84 reflecting the light having a wavelength of lambda 1 is provided between the LD 6 and the PD 83, and the PD 83 receives the optical signal Pr' passing through the waveguide layer 6c of the LD 6. Therefore, there is no need to prepare any optical waveguide passage for guiding the optical Pt from the LD 6 to the optical fiber 64 or for guiding the optical signal Pr' from the optical fiber 64 to the PD 83. The LD 6 and the optical fiber 64 are allowed to make a direct optical coupling therebetween. In order to form a quartz layer on the Si substrate of the PLC and an optical waveguide passage in that quartz layer, there has been required a very complex and costly manufacturing process so far. Accordingly, the manufacturing cost can be advantageously reduced by eliminating the process for forming such optical waveguide passage. Furthermore, disuse of the optical waveguide passage enables the PLC to become more compact.

Ninth Embodiment

Figure 27:
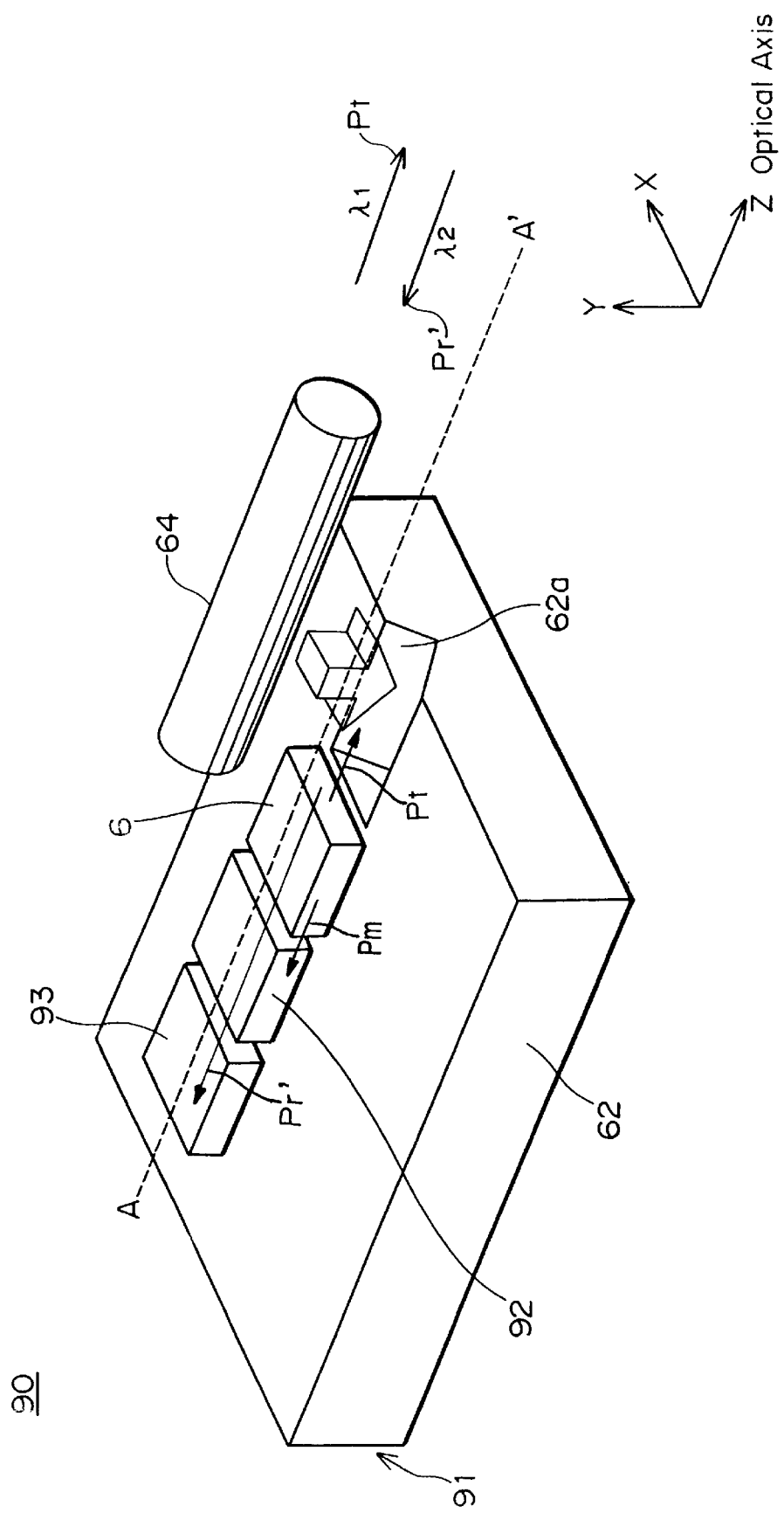
FIG. 27 is a perspective view of an optical signal transmitter-receiver module according to the ninth embodiment of the invention.
Figure 28:
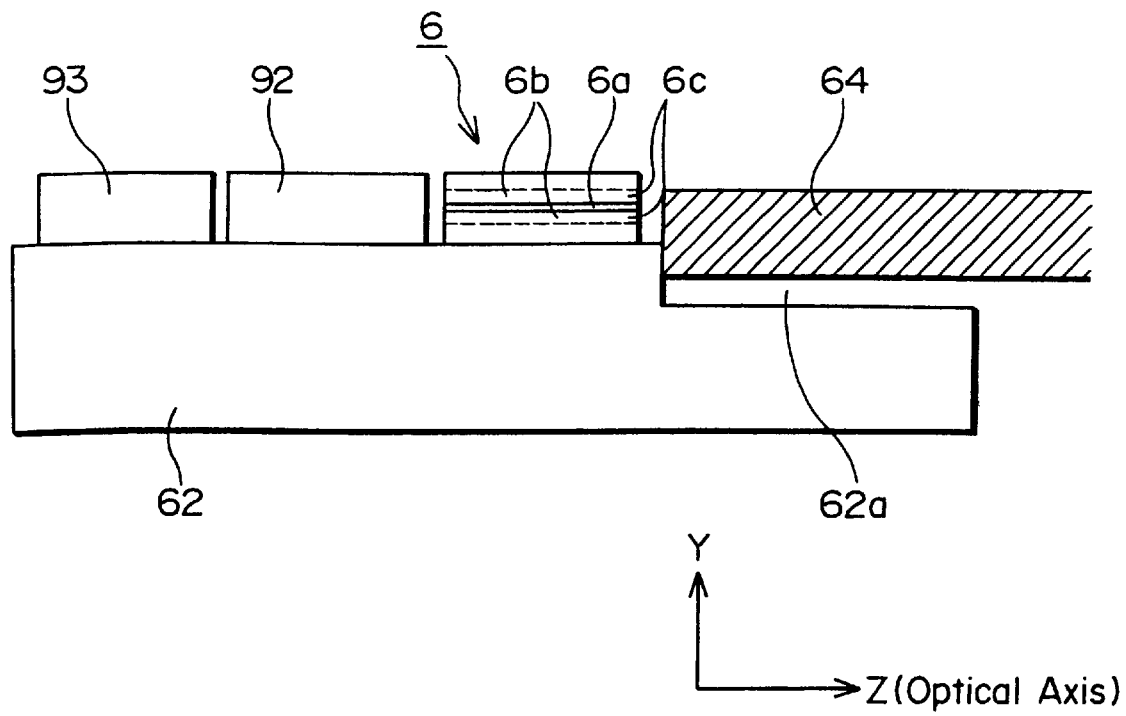
FIG. 28 is a cross sectional view taken on line A–A' in FIG. 27.
Figure 29:
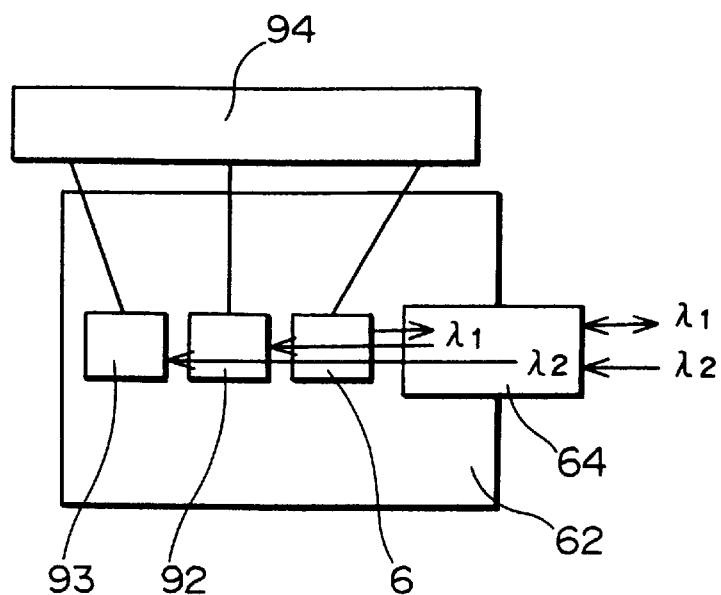
FIG. 29 is a plan view of the optical signal transmitter-receiver module according to the ninth embodiment of the invention.

FIG. 27 is a perspective view of an optical signal transmitter-receiver module according to the ninth embodiment of the invention. FIG. 28 is a cross sectional view taken on line A–A' in FIG. 27. FIG. 29 is a plan view of the optical signal transmitter-receiver module according to the ninth embodiment. In these figures, the parts essentially identical to those as shown in FIGS. 21 and 22 are indicated with the same reference numerals. Similar to the seventh embodiment, the optical transmitter-receiver 90 according to the ninth embodiment transmits the optical signal Pt and receives the optical signal Pr' asynchronously with transmission of the optical signal Pt, or transmits and receives the optical signal Pt and the optical signal Pr' in the time sharing mode.

The optical signal transmitter-receiver module 90 is provided with a PLC 91 and a signal transmission-reception circuit 94. This signal transmission-reception circuit 94 is the signal transmission-reception circuit 31 (FIG. 15) of the above third embodiment, in which the APC circuit 15 and the LIM circuit 18 are made to constantly operate.

The PLC 91 is made up with a Si substrate 62, an LD 6 generating the optical signal Pt (first optical signal), a PD 92 for monitoring the optical signal Pm (referred to as m-PD hereinafter), and a PD 93 receiving the optical signal Pr' (second optical signal) (referred to as r-PD hereinafter). On the Si substrate 62, there are provided a V-shaped groove 62a. Also, the LD 6, the m-PD 92 and the r-PD 93 are mounted on the surface of the Si substrate 62.

The LD 6 is arranged on the Si substrate 62 such that its front face is located in the vicinity of the optical fiber 64 that is directly mounted on the V-shaped groove 62a. This LD 6 includes a waveguide layer 6c that includes an active layer 6a generating the optical signal Pt and a clad layer 6b formed of upper and lower layers sandwiching the active layer 6a therebetween. The optical signal Pt emitted from the front face of the LD 6 comes in the optical fiber 64. This optical fiber 64 is positioned such that the optical signal Pr' as transmitted comes in the waveguide layer 6c (i.e. coming not only in the active layer 6a but also in the clad layer 6b). The active layer 6a absorbs the light having a wavelength of lambda 2 when the wavelength lambda 2 is shorter than the wavelength lambda 1 while the clad layer 6b allows the light having a wavelength of lambda 2 to pass therethrough regardless of the wavelength lambda 2 being longer or shorter than the wavelength lambda 1.

The m-PD 92 is arranged on the Si substrate 62 such that its front face stands close to the backside face of the LD 6. This m-PD 92 has such a receiving wavelength characteristic that it is sensitive to the light having a wavelength of lambda 1, but not to the light having a wavelength of lambda 2 (i.e. having a feature of absorbing the light having a wavelength of lambda 1 and permitting the light having a wavelength of lambda 2 to pass therethrough). This m-PD 92 receives and monitors the optical signal Pm emitted from the backside face of the LD 6 and allows the optical signal Pr' to pass through the waveguide layer 6c of the LD 6.

On one hand, the r-PD 93 is arranged on the Si substrate 62 such that its front side stands close to the backside face of the m-PD 92 and receives the receiving optical signal having a wavelength of lambda 2 being transmitted through the waveguide layer 6c and the m-PD 92 as well. Almost all the optical signal Pm emitted from the backside face of the LD6 is received (i.e. absorbed) by the m-PD 92 and hardly comes in the r-PD 93.

The above arrangement is applicable to the case where the wavelength lambda 2 is longer than the wavelength lambda 1. For instance, when lambda 1 is 1.3 micrometers and lambda 2 is 1.5 micrometers, a PD having a light receiving layer made of InGaAsP is used as the m-PD 92. InGaAsP is not sensitive to the light having a wavelength of lambda 2=1.5 micrometers (i.e. permitting it to pass through). In case the signal transmission-reception is carried out in the time sharing mode and the wavelength lambda 2 is shorter than the wavelength lambda 1, the r-PD 93 is arranged behind the LD 6 and the m-PD 92 is arranged behind the r-PD 93. At this time, a PD having such a receiving wavelength characteristic that is not sensitive to the light having a wavelength of lambda 1 but sensitive to the light having a wavelength of lambda 2 is used as the r-PD 93 (i.e. passing the light having a wavelength of lambda 1 and absorbing the light having a wavelength of lambda 2).

Figure 30:
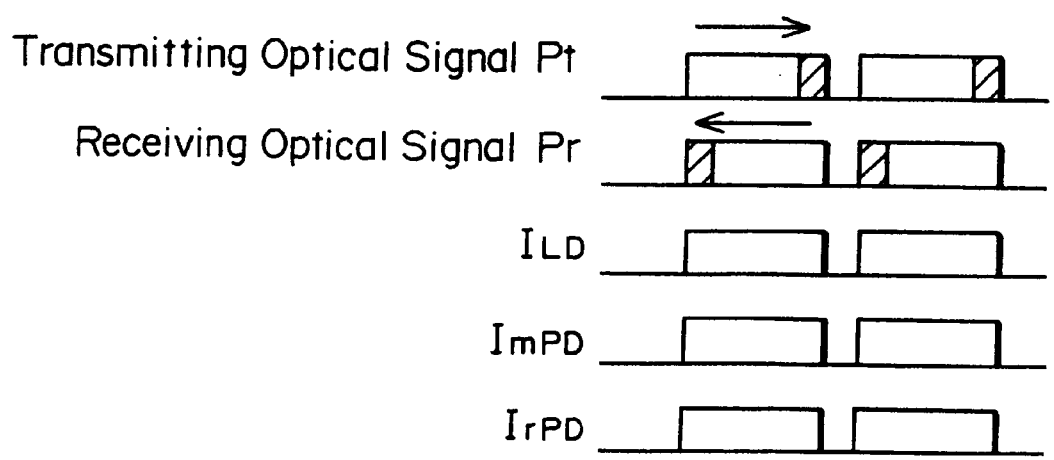
FIG. 30 is a timing chart for explaining the signal transmission-reception operation in the optical signal transmitter-receiver module according to the ninth embodiment of the invention.

In the next, there will be explained the operation of the optical signal transmitter-receiver module 90 according to the ninth embodiment of the invention. FIG. 30 is a timing chart for explaining the signal transmission-reception operation in the optical signal transmitter-receiver module according to the ninth embodiment of the invention. Here, similar to the seventh embodiment, it is assumed that the optical signal transmitter-receiver module 90 asynchronously transmits and receives the optical signal having a wavelength of lambda 1 and the optical signal having a wavelength of lambda 2.

In case of transmitting the optical signal having a wavelength of lambda 1, the driving current ILD corresponding to the transmitting electric signal is supplied to the LD 6 by the signal transmission-reception circuit 94, thereby making the active layer 6a of the LD 6 emit the optical signal Pt. This optical signal Pt is emitted from the front face of the LD 6 and comes in the optical fiber 64 and is then transmitted to the object receiving end. The optical signal Pm is emitted from the backside face of the LD 6 and is received by the m-PD 92, and is then converted into a monitoring current ImPD thereby. This monitoring current ImPD is inputted to the signal transmission-reception circuit 94. Then, this signal transmission-reception circuit 94 drives the LD 6 such that the above monitoring current is kept constant, thereby keeping the light emission power of the LD 6 constant.

On one hand, in case of receiving the optical signal having a wavelength of lambda 2, the optical signal Pr' as transmitted through the optical fiber 64 comes in and passes through the waveguide layer 6c of the LD6, and is then emitted from backside face of the LD 6. This optical signal Pr' passes through the m-PD 92 and is received by the r-PD 93, and is then converted into a receiving current IrPD thereby. This receiving current IrPD is further converted into the receiving electric signal by the signal transmission-reception circuit 94.

In the above signal transmission-reception operation, if the wavelength lambda 2 is longer than the wavelength lambda 1, the active layer 6a of the LD 6 acts as the transparent layer to the light having a wavelength of lambda 2, so that the receiving optical signal having a wavelength of lambda 2 is guided to the r-PD 93 by passing through the active layer 6a and the clad layer 6b of the waveguide layer 6c and the m-PD 92. Also, in case of the signal transmission-reception operation wherein the wavelength lambda 2 is shorter than the wavelength lambda 1 and the r-PD 93 is arranged between the LD 6 and the m-PD 93, the active layer 6a of the LD 6 acts as the absorption layer to the light having a wavelength of lambda 2, so that the optical signal Pr' is guided to the r-PD 93 by passing through the clad layer 6b of the waveguide layer 6c.

As described in the above, the optical signal transmitter-receiver module according to the ninth embodiment is constructed such that the m-PD 92 for use in monitoring the optical signal Pm is arranged behind the LD 6 generating the optical signals Pt and Pm, the r-PD 93 for receiving the receiving optical signal having a wavelength of lambda 2 is arranged behind the m-PD 92, and the optical signal Pm emitted from the backside face of the LD 6 is made to be received and monitored by the m-PD 92 while the optical signal Pr' passing through the waveguide layer 6c of the LD 6 and the m-PD 92 as well is made to be received by the r-PD 93. Therefore, the optical signal through the optical fiber 64 can be directly led to the LD 6 and the r-PD 93 without providing any optical waveguide passage. Accordingly, the manufacturing cost can be advantageously reduced by eliminating the optical waveguide passage. Furthermore, disuse of the optical waveguide passage enables the optical signal transmitter-receiver module to become more compact.

Figure 31A:
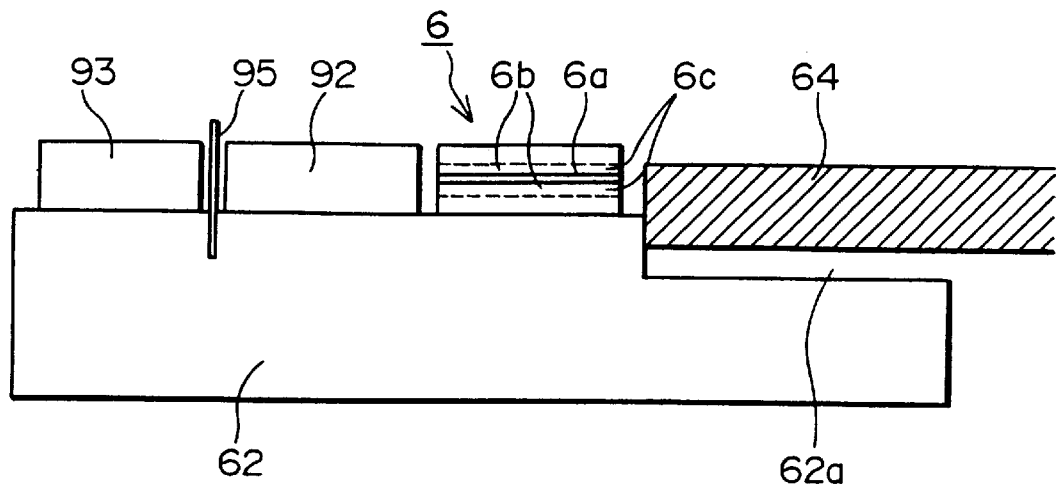
FIG. 31 is a cross sectional view of another optical signal transmitter-receiver module according to the ninth embodiment of the invention.
Figure 31B:
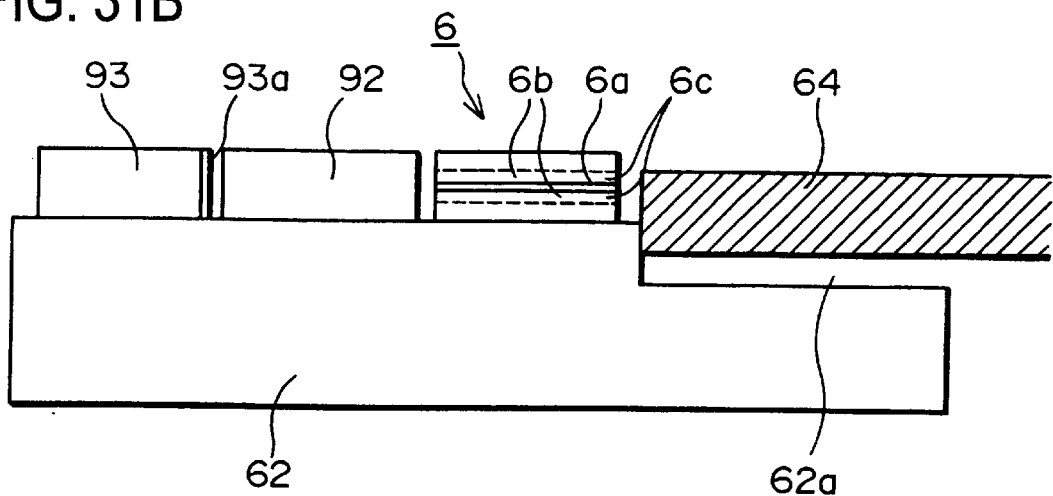
Figure 31C:
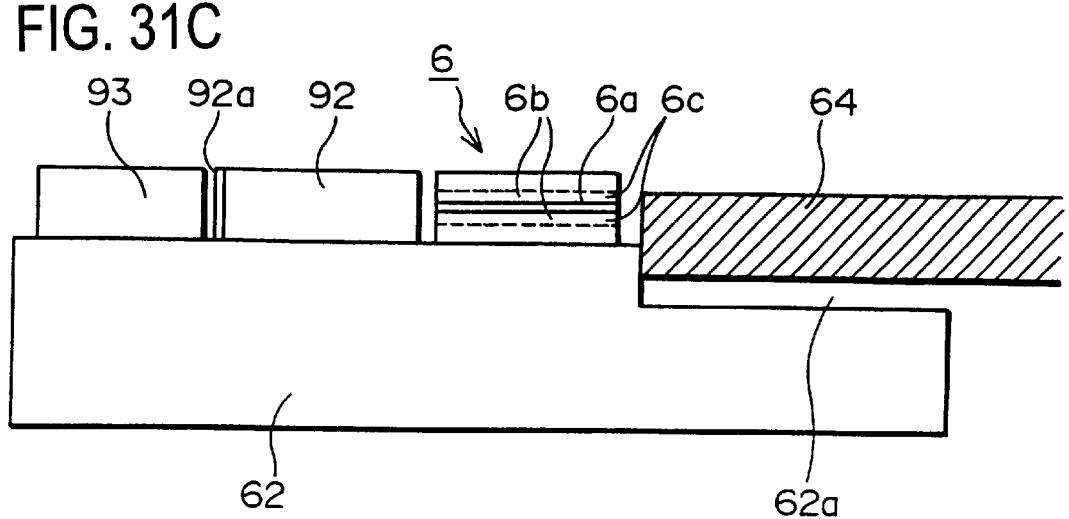

Furthermore, as shown in FIG. 31(a), in order to more completely isolate the optical signals Pt and Pr' from each other, there may be provided between the m-PD 92 and the r-PD 93 an optical filter 95 that reflects the light having a wavelength of lambda 1 and permits the light having a wavelength of lambda 2 to pass therethrough. Furthermore, as shown in FIG. 31(b), there may be alternatively provided on the front face of the r-PD 93 an optical thin film 93a that reflects the light having a wavelength of lambda 1 and permits the light having a wavelength of lambda 2 to pass therethrough. Still further, as shown in FIG. 31(c), there may be alternatively provided on the backside face of the m-PD 92 an optical thin film 92a that reflects the light having a wavelength of lambda 1 and permits the light having a wavelength of lambda 2 to pass therethrough.

Tenth Embodiment

Figure 32:
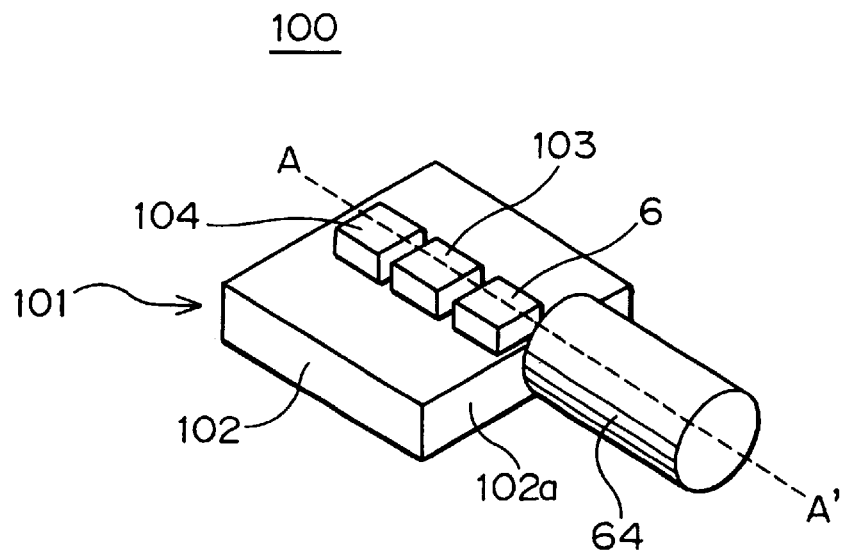
FIG. 32 is a perspective view of an optical signal transmitter-receiver module according to the tenth embodiment of the invention.
Figure 33:
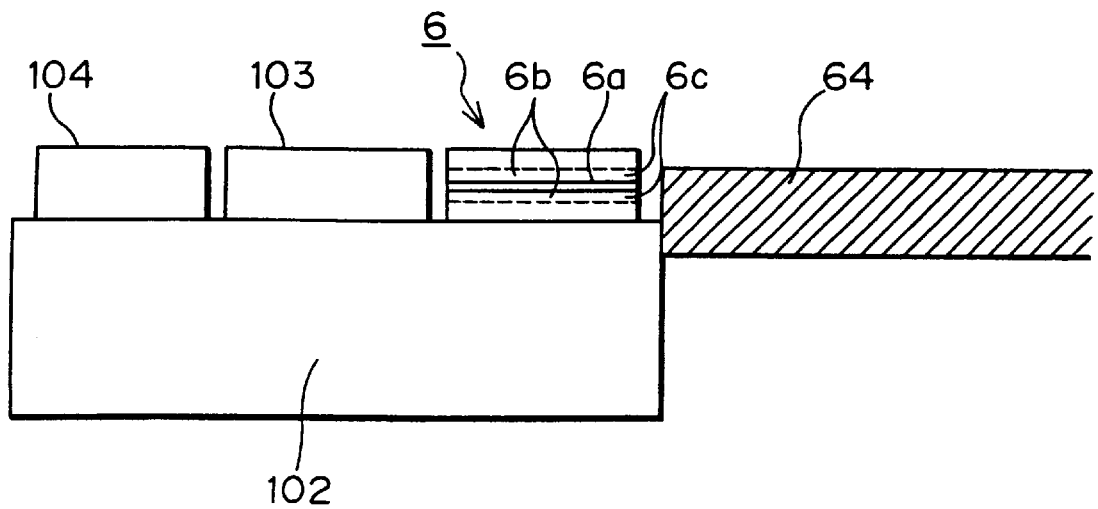
FIG. 33 is a cross sectional view taken on line A–A' in FIG. 32.
Figure 34:
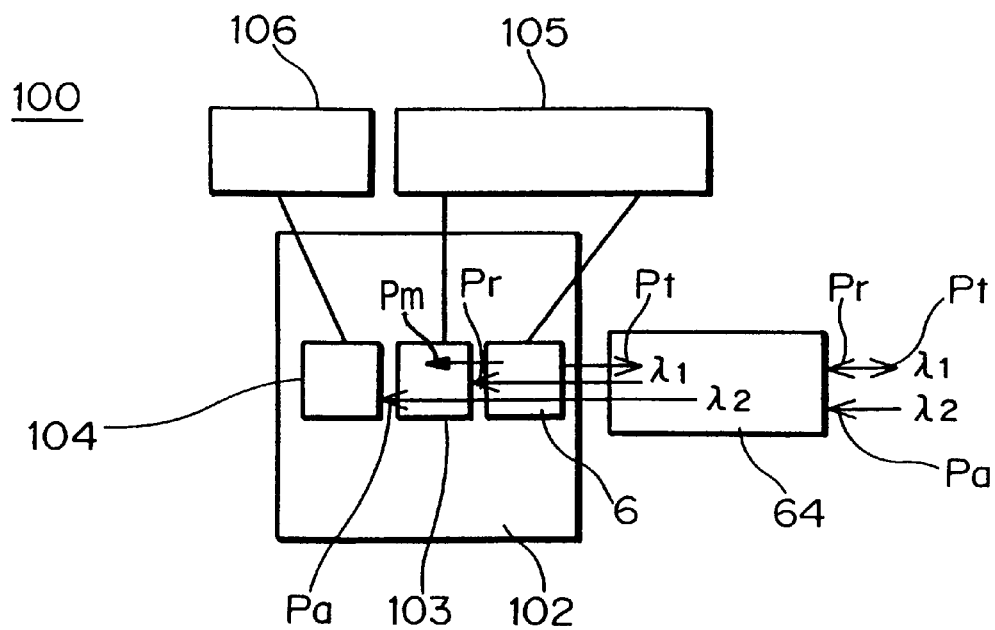
FIG. 34 is a plan view of the optical signal transmitter-receiver module according to the tenth embodiment of the invention.

FIG. 32 is a perspective view of an optical signal transmitter-receiver module according to the tenth embodiment of the invention. FIG. 33 is a cross sectional view taken on line A–A' in FIG. 32. FIG. 34 is a plan view of the optical signal transmitter-receiver module according to the tenth embodiment of the invention. The optical signal transmitter-receiver module 100 according to the tenth embodiment transmits and receives the optical signal having a wavelength of lambda 1 in the time sharing mode, and at the same time, it receives the optical signal having a wavelength of lambda 2 asynchronously with the transmission-reception of the optical signal having a wavelength of lambda 1. Here, it is assumed that the optical signal having a wavelength of lambda 2 is such an analog optical signal that is always inputted. The above wavelengths lambda 1 and lambda 2 are respectively 1.3 micrometers and 1.5 micrometers, for instance.

The optical signal transmitter-receiver module 100 according to the tenth embodiment 100 includes a PLC 101, a lambda 1 signal transmission-reception circuit 105, and lambda 2 signal receiving circuit 106. The lambda 1 signal transmission-reception circuit 105 is the signal transmission-reception circuit 19 of the above first embodiment. The lambda 2 signal receiving circuit 106 receives the analog optical signal having a wavelength of lambda 2 and converts the analog receiving current from the lambda 2-PD 104 of the PLC 101 into the analog electric signal. In the following description and the accompanying drawings, the analog optical signal having a wavelength of lambda 2 is referred to as "optical signal Pr2."

The PLC 101 is composed of a Si substrate 102, an LD 6 generating the optical signal Pt (first optical signal), a PD 103 receiving the optical signa Pr (second optical signal) (referred to as lambda 1-PD hereinafter), and a PD 104 receiving the optical signa Pr2 (second optical signal) (referred to as lambda 2-PD hereinafter). The LD 6, lambda 1-PD 103 and lambda 2-PD 104 are mounted on the surface of the Si substrate 102. The optical fiber 64 is arranged in the vicinity of the end face 102a of the Si substrate 102. In this case, the Si substrate 102 may be substituted for the Si substrate 62 (see FIG. 27) having the V-shaped groove 62a for positioning the optical fiber 64.

The LD 6 is arranged on the Si substrate 102 such that its front face is located in the vicinity of the optical fiber 64. This LD 6 has a waveguide layer 6c that includes an active layer 6a generating the optical signal Pt and a clad layer 6b formed of upper and lower layers that sandwich the active layer 6a therebetween. The optical signal Pt emitted from the front face of the LD 6 comes in the optical fiber 64. This optical fiber 64 is positioned such that the optical signals Pr and Pr2 as transmitted comes in the waveguide 6c (i.e. coming not only in the active layer 6a but also in the clad layer 6b).

The lambda 1-PD 103 is arranged on the Si substrate 102 such that its front face stands close to the backside face of the LD 6. This lambda 1-PD 103 has such a receiving wavelength characteristic that it is sensitive to the light having a wavelength of lambda 1, but not to the light having a wavelength of lambda 2 (i.e. it absorbs the light having a wavelength of lambda 1 while permitting the light having a wavelength of lambda 2 to pass therethrough). This lambda 1-PD 103 receives the optical signal Pr having passed through the waveguide layer 6c of the LD 6 while permitting the optical signal Pr2 having passed through the same.

The lambda 2-PD 104 is arranged on the Si substrate 102 such that its front face stands close to the backside face of the lambda 1-PD 103. This lambda 2-PD 104 receives the optical signal Pr2 having passed through the lambda 1-PD 103. Almost all the optical signal Pm emitted from the backside face of the LD 6 and the optical signal Pr having passed through the waveguide layer 6c of the LD 6 are received (i.e. absorbed) by the lambda 1-PD 103 and hardly comes in the lambda 2-PD 104.

Figure 35:
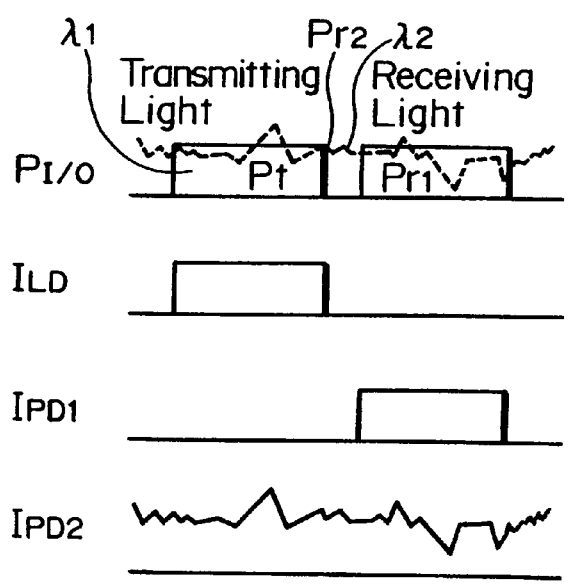
FIG. 35 is a timing chart for explaining the signal transmission-reception operation in the optical signal transmitter-receiver module according to the tenth embodiment of the invention.

In the next, there will be explained the operation of the optical signal transmitter-receiver module 100 according to the tenth embodiment. FIG. 35 is a timing chart for explaining the signal transmission-reception operation in the optical signal transmitter-receiver module 100 according to the tenth embodiment of the invention. This optical signal transmitter-receiver module 100 transmits and receives the optical signals (Pt, Pr) having a wavelength of lambda 1 in the time sharing mode and at the same time, receives the analog optical signal (Pr2) having a wavelength of lambda 2 that is always inputted.

During the period of signal transmission mode, the optical signals PI/O at the front face (optical fiber 64) of the LD 6 are the optical signal Pt and the optical signal Pr while being the optical signal Pr and the optical signal Pr2 during the period of signal reception mode.

At first, there will be explained the signal transmission-reception operation of the optical signals (Pt, Pr) having a wavelength of lambda 1. During the period of signal transmission mode, the driving current ILD responding to the transmitting electric signal is supplied to the LD 6 by the lambda 1 signal transmission-reception circuit 105, thereby making the active layer 6$a$ of the LD 6 emit the optical signal Pt. This optical signal Pt is emitted from the front face of the LD 6 and comes in the optical fiber 64, and is then transmitted to the object receiving end.

On one hand, during the period of signal reception mode, the optical signal Pr as transmitted through the optical fiber 64 comes in and passes through the waveguide layer 6$c$ of the LD6, and is then emitted from backside face of the LD 6. This optical signal Pr is received by the lambda 1-PD 103 and is then converted into the receiving current IPD1 thereby. This receiving current IPD1 is further converted into the receiving electric signal by the lambda 1 signal transmission-reception circuit 105. Almost all the receiving signal Pr1 is absorbed by the lambda 1-PD 103 so that it can hardly reach the lambda 2-PD 104.

In the next, there will be described the signal receiving operation of the analog optical signal (Pr2) having a wavelength of lambda 2.

The optical signal Pr2 always comes in the waveguide layer 6$c$ of the LD 6 through the optical fiber 64. At this time, since the wavelength lambda 2 is longer than the oscillation wavelength lambda 1 of the LD 6, both the clad layers 6$b$ and the active layer 6$a$ of the LD 6 equally act as a transparent layer (see FIG. 9). Accordingly, the optical signal Pr2 will give no influence to the oscillating operation of the LD 6 even though the LD 6 oscillates to emit the optical signal having a wavelength of lambda 1, so that it can pass through the clad layer 6$b$ and the active layer 6$a$ of the waveguide layer 6$c$ and comes in the lambda 1-PD 103. This optical signal Pr2 further passes through the lambda 1-PD 103 and comes in the lambda 2-PD 104, and is then converted into the analog receiving current IPD2 thereby. This analog receiving current IPD2 is converted into the analog receiving electric signal by the signal receiving circuit 106.

As described in the above, according to the tenth embodiment, the optical signal transmitter-receiver module is constructed such that the lambda 1-PD 103 receiving the optical signal Pr is arranged behind the LD 6 generating the optical signal Pt, the lambda 2-PD 104 receiving the optical signal Pr2 is arranged behind the lambda 1-PD 103, the optical signal Pr having passed through the waveguide layer 6$c$ of the LD 6 is received by the lambda 1-PD 103, and the receiving signal having a wavelength of lambda 2 having passed through the waveguide 6$c$ of the LD 6 and the lambda 1-PD 103 is received by the lambda 2-PD 104. Therefore, the optical signal can be directly led from the optical fiber 64 to the LD 6, the lambda 1-PD 103, and the lambda 2-PD 104 by additionally providing neither the optical waveguide passage nor the dielectric interference filter for the wavelength isolation. To disuse such additional optical waveguide passage and dielectric interference filter enables the manufacturing cost of the optical signal transmitter-receiver module to be reduced and also enables it to become more compact.

In the above tenth embodiment, the signal transmission-reception circuit 19 of the first embodiment is used as the lambda 1 transmission-reception circuit 105. However, the transmission-reception circuit 31 of the third embodiment may be alternatively used as the lambda 1 transmission-reception circuit 105. In this case, the lambda 1-PD 103 may function, during the period of signal reception mode, as the PD for monitoring the optical signal Pt emitted from the backside face of the LD6. Furthermore, the lambda 1 transmission-reception circuit 105 may be substituted for the signal transmission-reception circuit 41 of the fourth embodiment and also for the signal transmission-reception circuit 51 of the fifth embodiment.

Figure 36A:
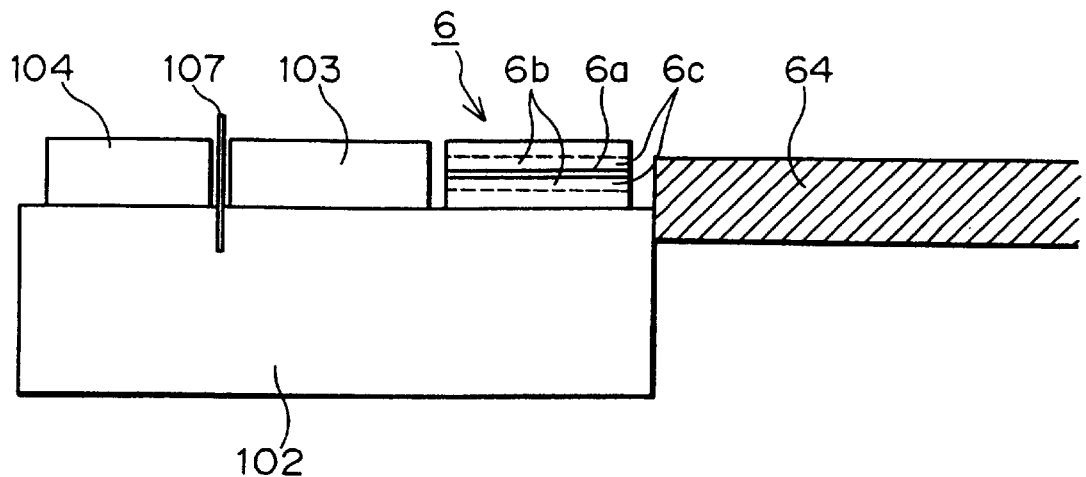
FIG. 36 is a cross sectional view of another optical signal transmitter-receiver module according to the tenth embodiment of the invention.
Figure 36B:
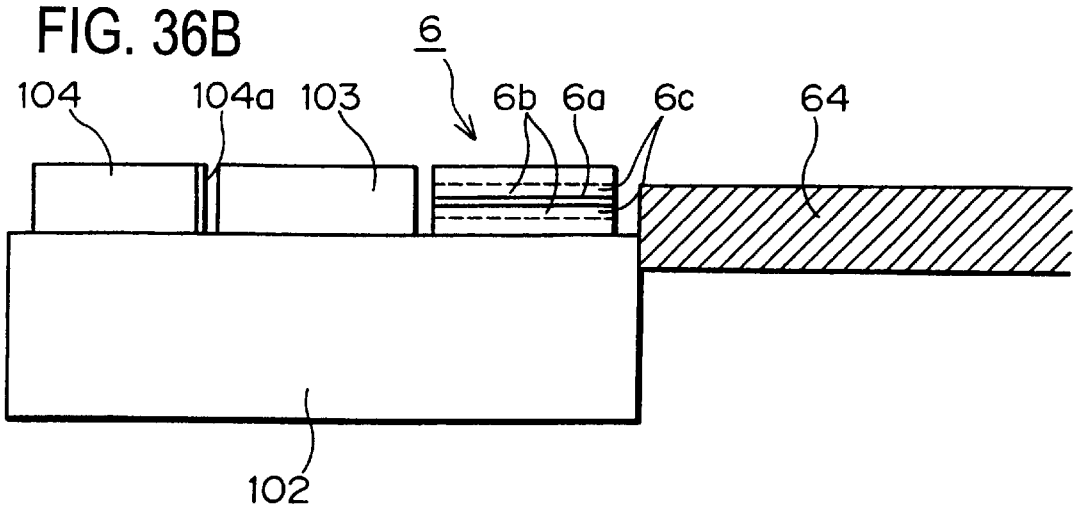
Figure 36C:
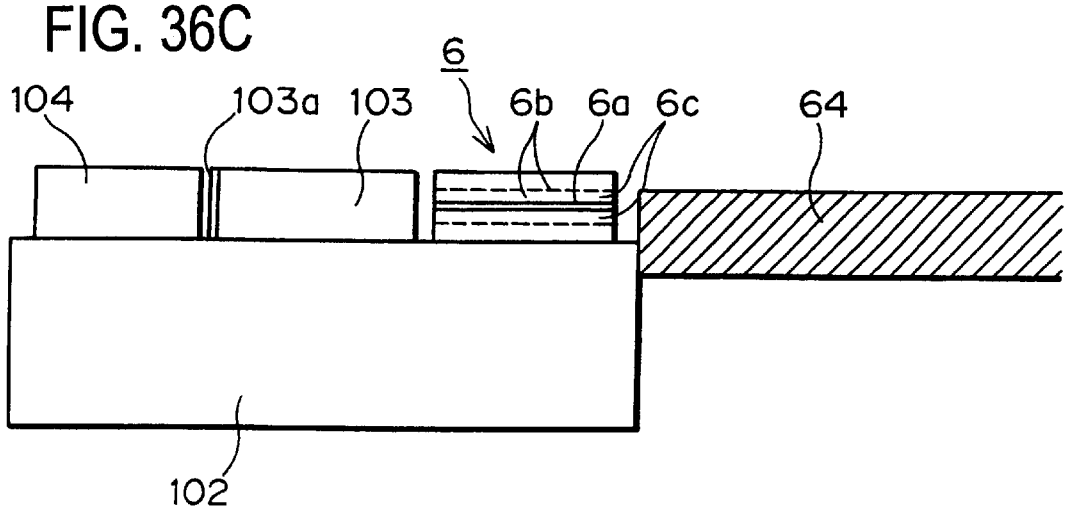
Figure 37:
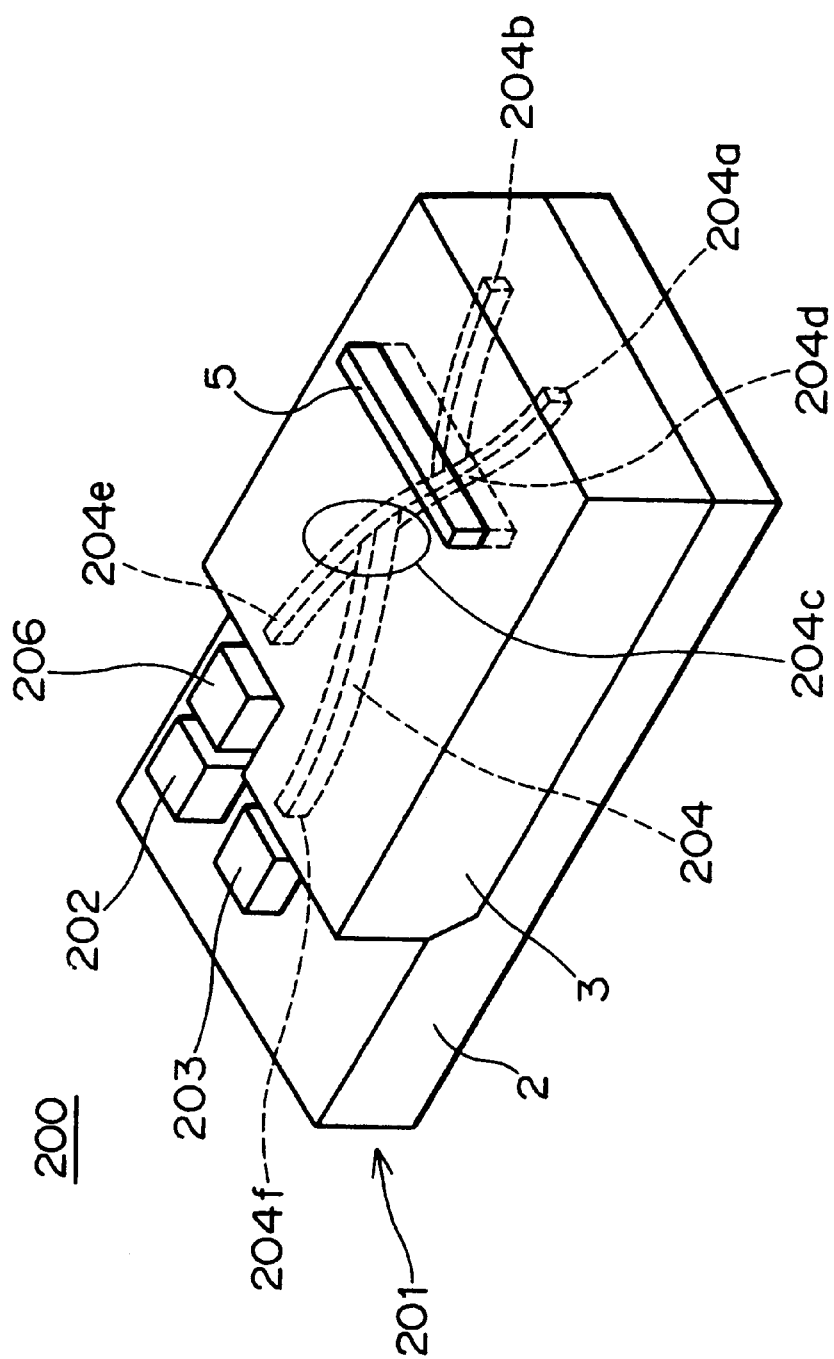
FIG. 37 is a perspective view of a prior art optical signal transmitter-receiver module.
Figure 38:
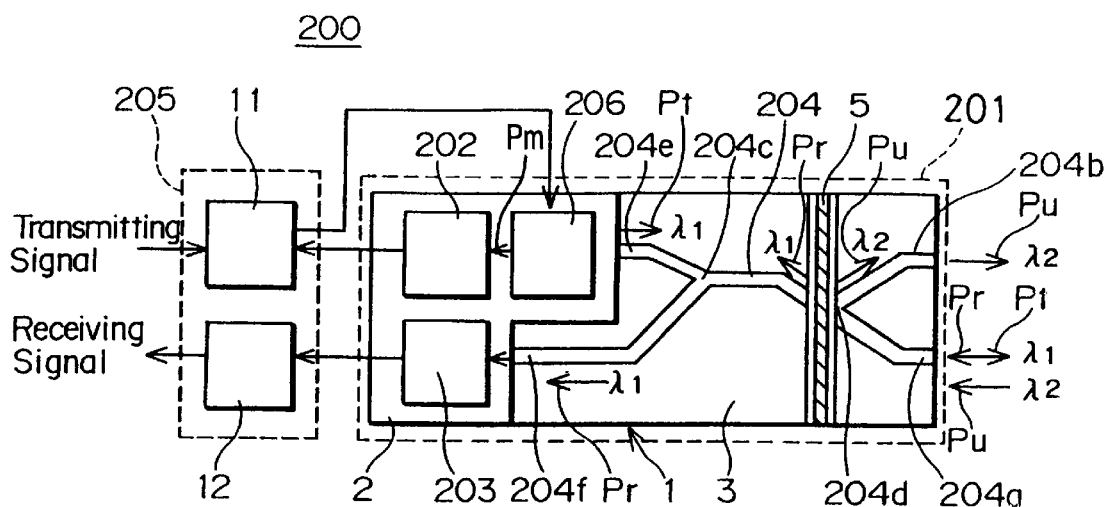
FIG. 38 is a plan view of the prior art optical signal transmitter-receiver module.
Figure 39:
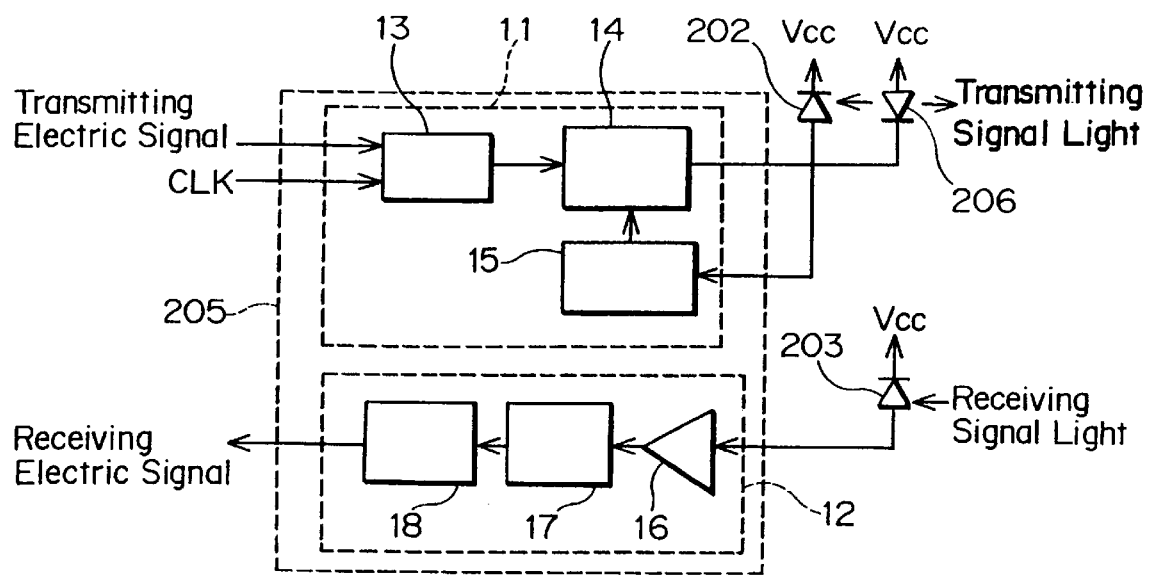
FIG. 39 is a structural illustration indicating the function of a signal transmission-reception circuit of the prior art optical signal transmitter-receiver module.
Figure 40:
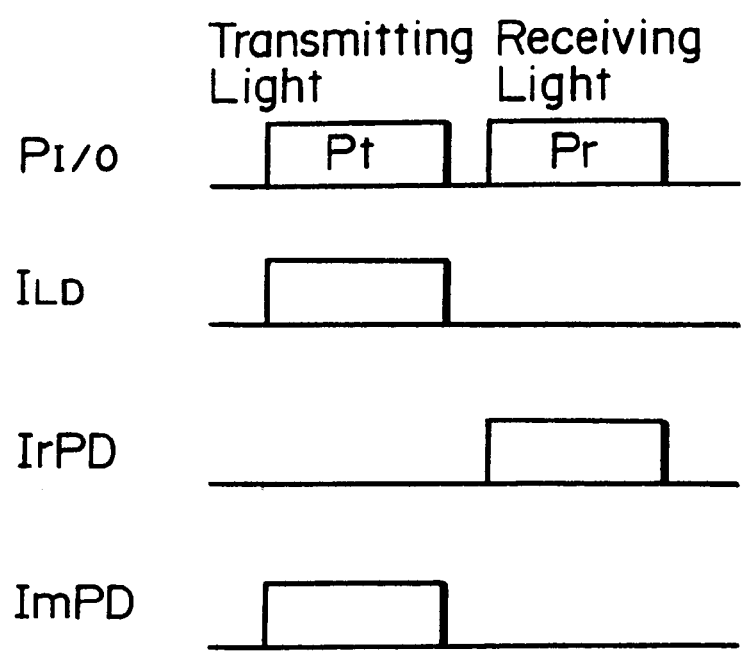
FIG. 40 is a timing chart for explaining the operation for transmitting and receiving the optical signal having a wavelength of lambda 1 in the prior art optical signal transmitter-receiver module.

Furthermore, as shown in FIG. 36($a$), in order to more completely isolate the optical signal having a wavelength of lambda 1 and the receiving optical signal having a wavelength of lambda 2 from each other, there may be provided between the lambda 1-PD 103 and the lambda 2-PD 104 an optical filter 107 that reflects the light having a wavelength of lambda 1 and permits the light having a wavelength of lambda 2 to pass therethrough. Also, as shown in FIG. 36($b$), there may be provided on the front face of the lambda 2-PD 104 an optical thin film 104$a$ that reflects the light having a wavelength of lambda 1 and permits the light having a wavelength of lambda 2 to pass therethrough. Furthermore, as shown in FIG. 36($c$), there may be provided on the backside face of the lambda 1-PD 103 an optical thin film 103$a$ that reflects the light having a wavelength of lambda 1 and permits the light having a wavelength of lambda 2 to pass therethrough.

In the first through tenth embodiments as described in the above, silicon has been used as a substrate material. However, the invention is not limited thereto. The substrate may be formed of various materials, for instance glass, ceramics, and plastics, or other semiconductors such as GaAs, InP and so forth. Also, in the first through tenth embodiments as described in the above, quartz has been used as a material for forming the optical waveguide passage. However, the invention is not limited thereto. The optical waveguide passage may be formed of plastics, semiconductors such as GaAs, InP, or other various materials, for instance.

As has been described in the above, according to the invention, the light receiving element is arranged behind the light emitting element so as to receive the second optical signal that has passed through the light emitting element. More specifically, according to the invention, the second optical signal as transmitted from the outside first comes in the waveguide layer of the light emitting element and this second signal passing through the waveguide layer is received by the light receiving element. Consequently, the optical signal transmitter-receiver module does not requires any Y-shaped branch for branching the second optical signal. As a result of this, the invention makes it possible to use a substrate with a smaller area for manufacturing the optical signal transmitter-receiver module, thus enabling the manufacture of the low cost optical signal transmitter-receiver module. Furthermore, according to the invention, since the optical loss is reduced by eliminating the Y-shaped branch, so that there can be enhanced the signal transmitting power and the light receiving sensitivity.

It is to be noted that λ 1 in FIGS. 2, 3, 6, 14, 19, 21, 25, 27, 29, 34, 35 and 38 illustrating the individual embodiments and the prior art explained earlier indicates the wavelength lambda 1 in the description for the individual embodiments and the prior art explained earlier. Likewise λ 2 in the same drawings illustrating the embodiments and the prior art indicates the wavelength of lambda 2.

The entire disclosure of Japanese Patent Application No. 10-116347 filed of Apr. 27, 1998 including specification, claims, drawings and summary is incorporated herein by reference in its entirety.

What is claimed is:

1. An optical signal transmitter-receiver module comprising:
   a light emitting element having an optical waveguide layer that allows a first optical signal and a second optical signal to propagate therethrough, a core layer that is formed in said optical waveguide layer and generates said first optical signal, a clad layer that is formed in said optical waveguide layer and allows said second optical signal to pass therethrough, a front face that emits the light propagating through said optical waveguide layer and receives the light emitted from an optical transmission means, and a backside face that emits the light having propagated through said optical waveguide layer;
   a first light receiving element having a front face through which the light emitted from the backside face of said light emitting element comes in, and said second optical signal incident thereon is received; and
   a substrate on which said light emitting element and said first light receiving element are installed.

2. An optical signal transmitter-receiver module as claimed in claim 1, wherein said light emitting element is a laser diode, said core layer is a layer acting as an active layer, and said clad layer is a layer acting as a transparent layer against said second optical signal.

3. An optical signal transmitter-receiver module as claimed in claim 2, further comprising a bias circuit that is connected with said laser diode and supplies a bias current lower than a oscillation threshold value of said laser diode when receiving said second optical signal.

4. An optical signal transmitter-receiver module as claimed in claim 1, wherein said substrate is provided with an optical waveguide passage that is arranged between said optical transmission means and the front face of said first light receiving element, transmits said first signal and said second signal, and guides a third optical signal to the outside, the third optical signal having a wavelength different from that of said second optical signal.

5. An optical signal transmitter-receiver module as claimed in claim 1, wherein said first optical signal and said second optical signal are transmitted and received in the time sharing mode.

6. An optical signal transmitter-receiver module as claimed in claim 5, wherein said first optical signal and said second optical signal are respectively composed of wavelength components contained in a range of optical signal receiving sensitivity, and said first light receiving element receives said first optical signal emitted from the backside face of said light emitting element during the period of transmitting said first optical signal, while receiving said second optical signal having passed through said light emitting element during the period of receiving said second optical signal.

7. An optical signal transmitter-receiver module as claimed in claim 6, further comprising a light emitting element driving circuit for driving said light emitting element; a control circuit that controls said light emitting element driving circuit based on the quantity of said first optical signal received by said first light receiving element so as to keep the light emission power constant; and a receiving circuit that generates the receiving electric signal based on the quantity of said second optical signal received by said first light receiving element.

8. An optical signal transmitter-receiver module as claimed in claim 7, further comprising a switching circuit that connects said first light receiving element only with the said controls circuit during the period of transmitting said first optical signal, and that connects said first light receiving element only with said signal receiving circuit during the period of receiving said second optical signal.

9. An optical signal transmitter-receiver module as claimed in claim 7, further comprising a current-voltage converting circuit for converting an inputted current into a voltage, said current-voltage converting circuit having an input terminal connected with the photodiode as said first light receiving element, and an output terminal connected with said control circuit and said signal receiving circuit as well.

10. An optical signal transmitter-receiver module as claimed in claim 1, wherein said substrate is provided with a V-shaped groove for positioning said optical transmission means.

11. An optical signal transmitter-receiver module as claimed in claim 1, wherein there is provided between said light emitting element and said first light receiving element an optical means that reflects or absorbs the wavelength component of said first optical signal and allows the wavelength component of said second optical signal to pass therethrough.

12. An optical signal transmitter-receiver module as claimed in claim 11, wherein said optical means is an optical filter that is arranged on said substrate.

13. An optical signal transmitter-receiver module as claimed in claim 11, wherein said optical means is an optical thin film that is formed on the backside face of said light emitting element.

14. An optical signal transmitter-receiver module as claimed in claim 11, wherein said optical means is an optical thin film that is formed on the front face of said first light receiving element.

15. An optical signal transmitter-receiver module as claimed in claim 1, further comprising a second light receiving element that is arranged behind said first light receiving element and receives a third optical signal having a wavelength different from that of said second optical signal, wherein the optical waveguide layer of said light emitting element allows said third optical signal having a wavelength different from that of said second optical signal to pass therethrough, and said first light receiving element allows said third optical signal incident on the front face thereof to pass therethrough.

16. An optical signal transmitter-receiver module as claimed in claim 15, further comprising an optical means that is arranged between said first light receiving element and said second light receiving element, reflects or absorbs said second optical signal, and allows said third optical signal to pass therethrough.

17. An optical signal transmitter-receiver module as claimed in claim 16, wherein said optical means is an optical filter that is arranged on said substrate.

18. An optical signal transmitter-receiver module as claimed in claim 16, wherein said optical means is an optical thin film that is formed on the backside face of said first light receiving element.

19. An optical signal transmitter-receiver module as claimed in claim 16, wherein said optical means is an optical thin film that is formed on the front face of said second light receiving element.

20. An optical signal transmitter-receiver module as claimed in claim 1, wherein the wavelength component of said first optical signal and that of said second optical signal are different from each other.

21. An optical signal transmitter-receiver module as claimed in claim 20, wherein said first optical signal and said second optical signal are asynchronously received.

* * * * *